(12) United States Patent
Yamazaki et al.

(10) Patent No.: US 11,412,445 B2
(45) Date of Patent: Aug. 9, 2022

(54) ACCESS POINT MANAGEMENT METHOD, ACCESS POINT MANAGEMENT APPARATUS, AND ACCESS POINT MANAGEMENT SYSTEM

(71) Applicant: NIPPON TELEGRAPH AND TELEPHONE CORPORATION, Tokyo (JP)

(72) Inventors: Takahiro Yamazaki, Tokyo (JP); Kenji Shimizu, Tokyo (JP); Atsushi Taniguchi, Tokyo (JP); Yohei Katayama, Tokyo (JP); Maiko Naya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/042,035

(22) PCT Filed: Apr. 8, 2019

(86) PCT No.: PCT/JP2019/015287
§ 371 (c)(1),
(2) Date: Sep. 25, 2020

(87) PCT Pub. No.: WO2019/203042
PCT Pub. Date: Oct. 24, 2019

(65) Prior Publication Data
US 2021/0029630 A1 Jan. 28, 2021

(30) Foreign Application Priority Data

Apr. 16, 2018 (JP) .............................. JP2018-078726

(51) Int. Cl.
*H04W 48/20* (2009.01)
*H04W 24/02* (2009.01)
(Continued)

(52) U.S. Cl.
CPC ........... *H04W 48/20* (2013.01); *H04W 24/02* (2013.01); *H04W 88/10* (2013.01); *H04W 88/12* (2013.01)

(58) Field of Classification Search
CPC ..... H04W 28/08; H04W 48/18; H04W 48/20; H04W 88/10; H04W 88/12; H04W 16/14;
(Continued)

(56) References Cited

U.S. PATENT DOCUMENTS

2018/0035248 A1* 2/2018 Soave .................... H04W 12/04
2018/0176800 A1* 6/2018 Sunay .................... H04W 72/04

OTHER PUBLICATIONS

Hideaki Kanno et al., "Software Defined Radio", OKI Technical Review, 204, vol. 72, No. 4, Oct. 2005, p. 80-85.

* cited by examiner

*Primary Examiner* — Quoc Thai N Vu
(74) *Attorney, Agent, or Firm* — Harness, Dickey & Pierce, P.L.C.

(57) ABSTRACT

An access point management method for managing a plurality of access points capable of providing wireless communication services in accordance with a plurality of wireless standards to a radio terminal apparatus includes acquiring plural pieces of request information which are used for requesting providing of the wireless communication service and include information indicating an area in which the wireless communication service is provided, selecting the access point assigned to each wireless communication service, based on the area requested by the plural pieces of request information acquired and characteristics of a wireless standard provided in the wireless communication service, and transmitting a request signal for deploying the wireless communication service corresponding to the request information, to the access point selected.

10 Claims, 32 Drawing Sheets

(51) Int. Cl.
*H04W 88/10* (2009.01)
*H04W 88/12* (2009.01)

(58) Field of Classification Search
CPC ............. H04W 84/12; H04W 28/0804; H04W 28/0808
See application file for complete search history.

| SERVICE ID | SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL | AP-ID IN USE | HARDWARE WIRELESS PROCESSING UNIT ID IN USE |
|---|---|---|---|---|---|---|---|---|---|---|---|
| - | - | - | - | - | - | - | - | - | - | - | - |

| AP-ID | INSTALLATION AREA | HARDWARE WIRELESS PROCESSING UNIT ID IN USE | PROVIDED WIRELESS STANDARD | NUMBER OF ACCOMMODATED TERMINAL APPARATUSES | SERVICE PROVIDING AREA | DATA RATE | GUARANTEED DELAY TIME |
|---|---|---|---|---|---|---|---|
| - | - | - | - | - | - | - | - |

| AP-ID | INSTALLATION AREA | POSITION INFORMATION | HARDWARE WIRELESS PROCESSING UNIT ID | WIRELESS STANDARD | SERVICE PROVIDING AREA | DATA RATE | GUARANTEED DELAY TIME: 100 ACCOMMODATED TERMINALS | GUARANTEED DELAY TIME: 200 ACCOMMODATED TERMINALS | GUARANTEED DELAY TIME: 300 ACCOMMODATED TERMINALS |
|---|---|---|---|---|---|---|---|---|---|
| AP1 | AREA A | POSITION INFORMATION OF AP1 IN AREA A | AP1-RF1 | 802.11 g | AREA A | 10 Mbps | 100 ms | 200 ms | 500 ms |
|  |  |  |  | LoRa | AREA A | 1 kbps | 500 ms | 500 ms | 500 ms |
|  |  |  |  |  | AREA B | 1 kbps | 500 ms | 500 ms | 500 ms |
|  |  |  |  |  | AREA C | 1 kbps | 500 ms | 500 ms | 500 ms |
|  |  |  |  |  | AREA D | 1 kbps | 800 ms | 800 ms | 800 ms |
| AP2 | AREA B | POSITION INFORMATION OF AP2 IN AREA B | AP2-RF1 | 802.11 g | AREA B | 10 Mbps | 100 ms | 200 ms | 500 ms |
|  |  |  |  | 802.11 ah | AREA B | 150 kbps | 300 ms | 300 ms | 300 ms |
|  |  |  |  |  | AREA A | 150 kbps | 500 ms | 500 ms | 500 ms |
|  |  |  |  |  | AREA C | 150 kbps | 500 ms | 500 ms | 500 ms |
| AP3 | AREA C | POSITION INFORMATION OF AP3 IN AREA C | AP3-RF1 | 802.11 ah | AREA A | 150 kbps | 300 ms | 300 ms | 500 ms |
|  |  |  |  |  | AREA B | 150 kbps | 500 ms | 500 ms | 500 ms |
|  |  |  |  | LoRa | AREA C | 1 kbps | 500 ms | 500 ms | 500 ms |
|  |  |  |  |  | AREA B | 1 kbps | 500 ms | 500 ms | 500 ms |
|  |  |  |  |  | AREA D | 1 kbps | 500 ms | 500 ms | 500 ms |
| AP4 | AREA D | POSITION INFORMATION OF AP4 IN AREA D | AP4-RF1 | 802.11 g | AREA A | 10 Mbps | 100 ms | 200 ms | 500 ms |
|  |  |  |  | LoRa | AREA D | 1 kbps | 500 ms | 500 ms | 500 ms |
|  |  |  |  |  | AREA C | 1 kbps | 500 ms | 500 ms | 500 ms |
|  |  |  |  |  | AREA B | 1 kbps | 500 ms | 500 ms | 500 ms |
|  |  |  |  |  | AREA A | 1 kbps | 800 ms | 800 ms | 800 ms |

Fig. 6

| POLICY ID | SELECTION FLAG | POLICY CONTENT |
|---|---|---|
| POLICY A | SELECTED | EMPHASIZE SHARING OF HARDWARE WIRELESS PROCESSING UNIT OF AP IN USE BETWEEN WIRELESS COMMUNICATION SERVICES |
| POLICY B | NOT SELECTED | EMPHASIZE SEPARATION OF HARDWARE WIRELESS PROCESSING UNITS IN AP FOR EACH WIRELESS COMMUNICATION SERVICE |
| ⋮ | ⋮ | ⋮ |

| WIRELESS STANDARD | NUMBER OF SERVICE PROVIDING TERMINAL APPARATUSES | DATA RATE | MAXIMUM DELAY TIME | MAXIMUM COMMUNICATION AVAILABLE RANGE |
|---|---|---|---|---|
| 802.11 g | 300 | 10 Mbps | 500 ms | 1 |
| 802.11 ah | 500 | 150 kbps | 500 ms | 2 |
| LoRa | 1000 | 1 kbps | 1 s | 3 |

| SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL |
|---|---|---|---|---|---|---|---|---|
| PROVIDER 1 | AREA A | 802.11 g | 100 | 1 Mbps | 500 ms | 2018/4/1 11:00:00 | 2018/4/2 15:00:00 | NORMAL |

Fig. 9

| SERVICE ID | SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL |
|---|---|---|---|---|---|---|---|---|---|
| 1 | PROVIDER 3 | AREAS A, B, C, D | LoRa | 100 | 1 kbps | 1 s | 2018/4/1 10:00:00 | 2018/4/1 15:00:00 | INTERMITTENT (10 sec/1 hour) |
| 2 | PROVIDER 2 | AREAS B, C | 802.11 ah | 100 | 150 kbps | 500 ms | 2018/4/1 9:00:00 | 2018/4/2 14:00:00 | INTERMITTENT (1 s/1 min) |
| 3 | PROVIDER 4 | AREA A | 802.11 g | 100 | 1 Mbps | 500 ms | 2018/4/1 11:00:00 | 2018/4/3 15:00:00 | NORMAL |
| 4 | PROVIDER 1 | AREA A | 802.11 g | 100 | 1 Mbps | 500 ms | 2018/4/1 11:00:00 | 2018/4/3 15:00:00 | NORMAL |

REQUEST INFORMATION

Fig. 10

| SERVICE ID | SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL |
|---|---|---|---|---|---|---|---|---|---|
| 5 | PROVIDER 5 | AREAS A, B, C, D | LoRa | 100 | 1 kbps | 1 s | 2018/4/2 10:00:00 | 2018/4/3 15:00:00 | INTERMITTENT (10 sec/1 hour) |
| 6 | PROVIDER 6 | AREAS B, C | 802.11 ah | 100 | 150 kbps | 500 ms | 2018/4/2 13:00:00 | 2018/4/4 16:00:00 | INTERMITTENT (1 s/1 min) |

Columns SERVICE PROVIDING AREA through COMMUNICATION INTERVAL: REQUEST INFORMATION

Fig. 11

| SERVICE ID | SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL | PROCESSING ORDER |
|---|---|---|---|---|---|---|---|---|---|---|
| 3 | PROVIDER 4 | AREA A | 802.11 g | 100 | 1 Mbps | 500 ms | 2018/4/1 11:00:00 | 2018/4/3 15:00:00 | NORMAL | |
| 4 | PROVIDER 1 | AREA A | 802.11 g | 100 | 1 Mbps | 500 ms | 2018/4/1 11:00:00 | 2018/4/3 15:00:00 | NORMAL | 1 |
| 2 | PROVIDER 2 | AREAS B, C | 802.11 ah | 100 | 150 kbps | 500 ms | 2018/4/1 9:00:00 | 2018/4/2 14:00:00 | 1 s/1 min | 2 |
| 1 | PROVIDER 3 | AREAS A, B, C, D | LoRa | 100 | 1 kbps | 1 s | 2018/4/1 10:00:00 | 2018/4/1 15:00:00 | 10 sec/1 h | 3 |

Fig. 14

| SERVICE ID | SERVICE PROVIDER ID | SERVICE PROVIDING AREA | WIRELESS STANDARD | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL | AP-ID IN USE | HARDWARE WIRELESS PROCESSING UNIT ID IN USE |
|---|---|---|---|---|---|---|---|---|---|---|---|
| 3 | PROVIDER 4 | AREA A | 802.11 g | 100 | 1 Mbps | 500 ms | 2018/4/1 11:00:00 | 2018/4/3 15:00:00 | NORMAL | AP1 | AP1-RF2 |
| 4 | PROVIDER 1 | AREA A | 802.11 g | 100 | 1 Mbps | 500 ms | 2018/4/1 11:00:00 | 2018/4/3 15:00:00 | NORMAL | AP1 | AP1-RF2 |
| 2 | PROVIDER 2 | AREAS B, C | 802.11 ah | 100 | 150 kbps | 500 ms | 2018/4/1 9:00:00 | 2018/4/2 14:00:00 | 1 s/1 min | AP2 | AP2-RF1 |
| 1 | PROVIDER 3 | AREAS A, B, C, D | LoRa | 100 | 1 kbps | 1 s | 2018/4/1 10:00:00 | 2018/4/1 15:00:00 | 10 sec/1 h | AP3 | AP3-RF1 |

Fig. 16

| AP-ID | INSTALLATION AREA | HARDWARE WIRELESS PROCESSING UNIT ID IN USE | PROVIDED WIRELESS STANDARD | NUMBER OF ACCOMMODATED TERMINAL APPARATUSES | SERVICE PROVIDING AREA | DATA RATE | GUARANTEED DELAY TIME |
|---|---|---|---|---|---|---|---|
| AP1 | AREA A | AP1-RF1 | 802.11 g | 200 | AREA A | 10 Mbps | 200 ms |
| AP2 | AREA B | AP2-RF1 | 802.11 ah | 100 | AREAS B, C | 150 kbps | 500 ms |
| AP3 | AREA C | AP3-RF1 | LoRa | 100 | AREAS A, B, C, D | 1 kbps | 800 ms |

| POLICY ID | SELECTION FLAG | POLICY CONTENT |
|---|---|---|
| POLICY A | NOT SELECTED | EMPHASIZE SHARING OF HARDWARE WIRELESS PROCESSING UNIT OF AP IN USE BETWEEN WIRELESS COMMUNICATION SERVICES |
| POLICY B | SELECTED | EMPHASIZE SEPARATION OF HARDWARE WIRELESS PROCESSING UNITS IN AP FOR EACH WIRELESS COMMUNICATION SERVICE |
| ... | ... | ... |

| SERVICE PROVIDER ID | SERVICE PROVIDING AREA | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL |
|---|---|---|---|---|---|---|---|
| PROVIDER 1 | AREA A | 100 | 1 Mbps | 500 ms | 2018/4/1 11:00:00 | 2018/4/2 15:00:00 | NORMAL |

Fig. 21

| SERVICE ID | SERVICE PROVIDER ID | SERVICE PROVIDING AREA | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL |
|---|---|---|---|---|---|---|---|---|
| 1 | PROVIDER 3 | AREAS A, B, C, D | 100 | 1 kbps | 1 s | 2018/4/1 10:00:00 | 2018/4/1 15:00:00 | INTERMITTENT (10 sec/1 hour) |
| 2 | PROVIDER 2 | AREAS B, C | 100 | 150 kbps | 500 ms | 2018/4/1 9:00:00 | 2018/4/2 14:00:00 | INTERMITTENT (1 s/1 min) |
| 3 | PROVIDER 4 | AREA A | 100 | 1 Mbps | 500 ms | 2018/4/1 11:00:00 | 2018/4/3 15:00:00 | NORMAL |
| 4 | PROVIDER 1 | AREA A | 100 | 1 Mbps | 500 ms | 2018/4/1 11:00:00 | 2018/4/3 15:00:00 | NORMAL |

REQUEST INFORMATION

Fig. 22

| SERVICE ID | SERVICE PROVIDER ID | SERVICE PROVIDING AREA | NUMBER OF SERVICE PROVIDING TERMINAL APPARATUSES | DATA RATE | ALLOWABLE DELAY TIME | SERVICE START DATE AND TIME | SERVICE END DATE AND TIME | COMMUNICATION INTERVAL | PROCESSING ORDER |
|---|---|---|---|---|---|---|---|---|---|
| 3 | PROVIDER 4 | AREA A | 100 | 1 Mbps | 500 ms | 2018/4/1 11:00:00 | 2018/4/3 15:00:00 | NORMAL | |
| 4 | PROVIDER 1 | AREA A | 100 | 1 Mbps | 500 ms | 2018/4/1 11:00:00 | 2018/4/3 15:00:00 | NORMAL | 1 |
| 2 | PROVIDER 2 | AREAS B, C | 100 | 150 kbps | 500 ms | 2018/4/1 9:00:00 | 2018/4/2 14:00:00 | 1 s/1 min | 2 |
| 1 | PROVIDER 3 | AREAS A, B, C, D | 100 | 1 kbps | 1 s | 2018/4/1 10:00:00 | 2018/4/1 15:00:00 | 10 sec/1 h | 3 |

Fig. 24

| SERVICE ID | SERVICE PROVIDER ID | SERVICE PROVIDING AREA | WIRELESS STANDARD | NUMBER OF SERVICE PROVIDING TERMINALS | DATA RATE | ALLOWABLE DELAY TIME | SERVICE START DATE AND TIME | SERVICE END DATE AND TIME | COMMUNICATION INTERVAL | AGGREGATED GROUP ID |
|---|---|---|---|---|---|---|---|---|---|---|
| 1 | PROVIDER 3 | AREAS A, B, C, D | LoRa | 100 | 1 kbps | 1 s | 2018/4/1 10:00:00 | 2018/4/1 15:00:00 | 10 sec/1 h | a |
| 2 | PROVIDER 2 | AREAS B, C | 802.11ah | 100 | 150 kbps | 500 ms | 2018/4/1 9:00:00 | 2018/4/2 14:00:00 | 1 s/1 min | a |
| 3 | PROVIDER 4 | AREA A | 802.11g | 100 | 1 Mbps | 500 ms | 2018/4/1 11:00:00 | 2018/4/3 15:00:00 | NORMAL | b |
| 4 | PROVIDER 1 | AREA A | 802.11g | 100 | 1 Mbps | 500 ms | 2018/4/1 11:00:00 | 2018/4/3 15:00:00 | NORMAL | b |

Fig. 29

| SERVICE ID | SERVICE PROVIDER ID | SERVICE PROVIDING AREA | WIRELESS STANDARD | NUMBER OF SERVICE PROVIDING TERMINALS | DATA RATE | ALLOWABLE DELAY TIME | SERVICE START DATE AND TIME | SERVICE END DATE AND TIME | COMMUNICATION INTERVAL | AGGREGATED GROUP ID | PROCESSING ORDER |
|---|---|---|---|---|---|---|---|---|---|---|---|
| 3 | PROVIDER 4 | AREA A | 802.11g | 100 | 1 Mbps | 500 ms | 2018/4/1 11:00:00 | 2018/4/3 15:00:00 | NORMAL | | |
| 4 | PROVIDER 1 | AREA A | 802.11g | 100 | 1 Mbps | 500 ms | 2018/4/1 11:00:00 | 2018/4/3 15:00:00 | NORMAL | b | 1 |
| 2 | PROVIDER 2 | AREAS B, C | 802.11ah | 100 | 150 kbps | 500 ms | 2018/4/1 9:00:00 | 2018/4/2 14:00:00 | 1 s/1 min | | |
| 1 | PROVIDER 2 | AREAS A, B, C, D | LoRa | 100 | 1 kbps | 1 s | 2018/4/1 10:00:00 | 2018/4/1 15:00:00 | 10 sec/1 h | a | 2 |

Fig. 30

ACCESS POINT MANAGEMENT METHOD, ACCESS POINT MANAGEMENT APPARATUS, AND ACCESS POINT MANAGEMENT SYSTEM

CROSS-REFERENCE TO RELATED APPLICATIONS

This application is a 371 National Stage of International Application No. PCT/JP2019/015287, filed on Apr. 8, 2019, which claims priority to Japanese Patent Application No. 2018-078726, filed Apr. 16, 2018. The entire disclosures of the above applications are incorporated herein by reference.

TECHNICAL FIELD

The present disclosure relates to an access point management method, an access point management apparatus, and an access point management system.

BACKGROUND ART

In the age of 5th Generation (5G) which began in 2020, it is anticipated that wireless usage will be further diversified. Various wireless standards are being formulated to provide many services in the future. For example, such services include a service allowing use in time or regional limitations, an Internet of Things (IoT) service such as a smart meter, which uses an advanced regional Broadband Wireless Access (BWA), advanced Low Power Wide Area (LPWA), or the like, a next-generation Intelligent Transport System (ITS) service using a vehicle communication. Thus, the number of wireless standards tends to continuously increase.

In order to provide a plurality of wireless standard services, there is a need to install an access point (referred to as "an AP" below) for each wireless standard. Thus, if an AP is set to be installed for all wireless standards when a wide variety of wireless standards that are assumed in the 5G age are provided, for example, an area design required for each wireless standard is to be performed. If the area design and the like required for each wireless standard is performed, the management becomes very complex, the number of APs to be managed increases largely, and the number of installation areas and power consumption also increases depending on the number of APs to be installed. Thus, it is not practical to normally provide facilities to cover all wireless standards planned to be provided. A wireless communication infrastructure provider is required to flexibly apply services of various wireless standards under various circumstances, for example, a service to be provided is deployed in accordance with a time of providing the service or the required contents.

As a technology for switching and providing a plurality of wireless standards, a technology referred to as Software Defined Radio (SDR) is provided (for example, see Non-Patent Literature 1).

For example, as illustrated in FIG. 31, if there is an attempt to provide two wireless standards A and B in a wireless apparatus 500 such as a radio terminal apparatus or an AP, the wireless apparatus 500 has a need to include an antenna 501, a radio frequency unit 502, a converter 503, and a digital signal processing unit 504 for the wireless standard A and to include an antenna 511, a radio frequency unit 512, a converter 513, and a digital signal processing unit 514 for the wireless standard B. Here, the converter 503 and converter 513 are devices that include both an A/D (Analog to Digital) converter configured to convert a received signal from an analog signal into a digital signal and a D/A (Digital to Analog) converter configured to convert a signal to be transmitted from a digital signal to an analog signal.

In contrast, in a wireless apparatus 600 corresponding to SDR, as illustrated in FIG. 32, baseband signals are collectively down-converted to a frequency band in which digital signal processing is easily performed, by a radio frequency unit 602. A converter 603 converts an analog signal into a digital signal. A digital signal processing unit 604 reads a program data of software stored in a storage region for each provided wireless standard, and performs demodulation processing in accordance with the wireless standard. In transmission, the digital signal processing unit 604 performs modulation processing in accordance with the wireless standard, and the converter 603 converts the digital signal into an analog signal, and the radio frequency unit 602 up-converts the signal to a frequency band of a transmission signal. Switching to the other wireless standard is performed in a manner that the digital signal processing unit 604 reads a program data of software corresponding to the other wireless standard. As described above, it is possible to support various wireless standards by switching software to be applied to the digital signal processing unit 604.

It is possible to reduce the installation area or power consumption and also reduce the number of APs to be managed, by using such a wireless apparatus 600 corresponding to SDR as an AP. However, management of the individual software wireless apparatus 600 in response to a service request may be complicated. For such problems, a method of dynamically assigning wireless standards in response to a service request using SDR is considered.

CITATION LIST

Non Patent Literature

Non-Patent Literature 1: Hideaki Kanno, Hideaki Odagiri, Kenji Koro, "Software Defined Radio", Oki Technical Review, 204, Vol. 72, No. 4, October 2005, p. 80 to 85.

SUMMARY OF THE INVENTION

Technical Problem

If an AP is sequentially assigned to a service request from a service provider, the previously selected AP may be required to redeploy the wireless standard to the AP in order to respond to the subsequent other service requests. For example, in a case where there are AP1 and AP2 that can be assigned to an area A and an area B, respectively, it is assumed that a base stations satisfying the condition of a first service request (Service 1) are AP1 and AP2, and AP1 is selected. Then, in the subsequent service request (Service 2), in a case where the base station satisfying the condition is only AP1, it may be necessary to change the base station of Service 1 to AP2. Redeployment of the AP leads to service interruption, and thus it is necessary to avoid the redeployment as much as possible. However, the known technology has a problem in that, because an AP is sequentially assigned in response to a service request, optimal assignment of the AP in combination with other service requests is unavailable.

Considering the above circumstances, an object of the present disclosure is to provide a technology for optimally assigning access points in response to a plurality of service requests.

Means for Solving the Problem

According to an aspect of the present disclosure, an access point management method for managing a plurality of access points capable of providing wireless communication services in accordance with a plurality of wireless standards to a radio terminal apparatus, the method including: acquiring plural pieces of request information used for requesting to provide the wireless communication service, the plural pieces of request information including information indicating an area in which the wireless communication service is provided; selecting the access point assigned to each wireless communication service, based on the area requested by the plural pieces of request information acquired and characteristics of a wireless standard provided in the wireless communication service; and transmitting a request signal for deploying the wireless communication service corresponding to the request information, to the access point selected.

According to the aspect of the present disclosure, in selecting the access point assigned to each wireless communication service, an order of assigning the access point to each wireless communication service by sorting the wireless communication service in an ascending order of narrowness of the area requested by each of the plural pieces of request information.

According to the aspect of the present disclosure, in the access point management method, in selecting the access point assigned to each wireless communication service, an order of assigning the access point to each wireless communication service by sorting the wireless communication service in an ascending order of narrowness of the area requested by each of the plural pieces of request information and sorting the wireless communication service after sorting, in accordance with characteristics of the wireless standard.

According to the aspect of the present disclosure, in the access point management method, in selecting the access point assigned to each wireless communication service, the wireless communication service after sorting is sorted in an ascending order of narrowness of a maximum communication available range of the wireless standard while maintaining an order of narrowness of the area, and the access point is assigned in an order of narrowness of the area and in an ascending order of narrowness of a maximum communication available range of the wireless standard.

According to the aspect of the present disclosure, in the access point management method, in selecting the access point assigned to each wireless communication service, the plural pieces of acquired request information is grouped in accordance with a predetermined condition; and the wireless communication service required by each of the plural pieces of request information is sorted in response to any one or both of the request information belonging to a group obtained by grouping and the request information which does not belong to the group.

According to the aspect of the present disclosure, in the access point management method, in selecting the access point assigned to each wireless communication service, in a case where the wireless standards used for different pieces of request information are identical to each other, and the request condition is satisfied, the different pieces of request information are grouped to the same group.

According to the aspect of the present disclosure, in the access point management method, in selecting the access point assigned to each wireless communication service, in a case where the wireless standards used for different pieces of request information are different from each other, communication intervals of the wireless standard are intermittent, and communication timing is capable of being shifted from each other, the different pieces of request information are grouped to the same group.

According to the aspect of the present disclosure, in the access point management method, in selecting the access point assigned to each wireless communication service, in a case where there is the request information belonging to the group, request information of requesting a narrowest area among pieces of the request information belonging to the group is set to representative request information of the group, and the wireless communication service is sorted in response to any one or both of the representative request information and the request information which does not belong to the group.

According to the aspect of the present disclosure, in the access point management method, in selecting the access point assigned to each wireless communication service, in a case where there is the request information belonging to the group, request information of providing the wireless standard in which a maximum communication available range of the wireless standard is narrowest, among pieces of request information belonging to the group is set to representative request information of the group, the wireless communication service after sorting is sorted in an ascending order of a maximum communication available range of the wireless standard while maintaining an order of narrowness of the area, and the access point is assigned in an ascending order of narrowness of the area and in an ascending order of a maximum communication available range of the wireless standard.

According to an aspect of the present disclosure, an access point management apparatus for managing a plurality of access points capable of providing wireless communication services in accordance with a plurality of wireless standards to a radio terminal apparatus, the apparatus including: an acquisition unit that acquires plural pieces of request information used for requesting to provide the wireless communication service, the plural pieces of request information including information indicating an area in which the wireless communication service is provided; a selection unit that selects the access point assigned to each wireless communication service, based on the area requested by the plural pieces of request information acquired and characteristics of a wireless standard provided in the wireless communication service; and a requesting unit that transmits a request signal for deploying the wireless communication service corresponding to the request information, to the access point selected.

According to an aspect of the present disclosure, an access point management system including: a plurality of access points that provides wireless communication services in accordance with a plurality of wireless standards to a radio terminal apparatus; and an access point management apparatus that manages the plurality of access points, wherein the access point management apparatus includes an acquisition unit that acquires plural pieces of request information used for requesting to provide the wireless communication service, the plural pieces of request information including information indicating an area in which the wireless communication service is provided, a selection unit that selects the access point assigned to each wireless communication service, based on the area requested by the plural pieces of request information acquired and characteristics of a wireless standard provided in the wireless communication service, and a requesting unit that transmits a request signal for deploying the wireless communication service corresponding to the request information, to the selected access point; and the access point includes a control unit that receives the request signal and outputs an instruction signal in response to the request signal, and a wireless processing unit that provides the wireless communication service based on the instruction signal.

Effects of the Invention

According to the present disclosure, it is possible to optimally assign access points in response to a plurality of service requests.

BRIEF DESCRIPTION OF DRAWINGS

FIG. 4 is a diagram illustrating a data configuration of a wireless service AP information table in the first embodiment.

FIG. 5 is a diagram illustrating a data configuration of an AP use status information table in the first embodiment.

FIG. 6 is a diagram illustrating a data configuration of an AP capacity information table in the first embodiment.

FIG. 7 is a diagram illustrating a data configuration of a policy information table in a state where Policy A is selected in the first embodiment.

FIG. 8 is a diagram illustrating a data configuration of a wireless standard characteristic table in the first embodiment.

FIG. 9 is a diagram illustrating a data configuration of request information in the first embodiment.

FIG. 10 is a diagram illustrating a data configuration of a scheduling buffer in the first embodiment.

FIG. 11 is a diagram illustrating the data configuration of the scheduling buffer in the first embodiment.

FIG. 14 is a diagram illustrating the data configuration of the scheduling buffer after sorting processing in the first embodiment.

FIG. 16 is a diagram illustrating a data configuration of a wireless service AP information table when a wireless communication service by request information is deployed in the first embodiment.

FIG. 17 is a diagram illustrating a data configuration of an AP use status information table when the wireless communication service by the request information is deployed in the first embodiment.

FIG. 18 is a flowchart illustrating deployment processing of the wireless communication service by Policy B in the first embodiment.

FIG. 21 is a diagram illustrating a data configuration of request information in the second embodiment.

FIG. 22 is a diagram illustrating the data configuration of the scheduling buffer in the second embodiment.

FIG. 24 is a diagram illustrating the data configuration of the scheduling buffer after sorting processing in the second embodiment.

FIG. 29 is a diagram illustrating a data configuration of a scheduling buffer after the aggregation determination processing in the third embodiment.

FIG. 30 is a diagram illustrating a data configuration of the scheduling buffer after sorting processing in the third embodiment.

DESCRIPTION OF EMBODIMENTS

First Embodiment

Hereinafter, embodiments of the present disclosure will be described with reference to the drawings.

Figure 1:
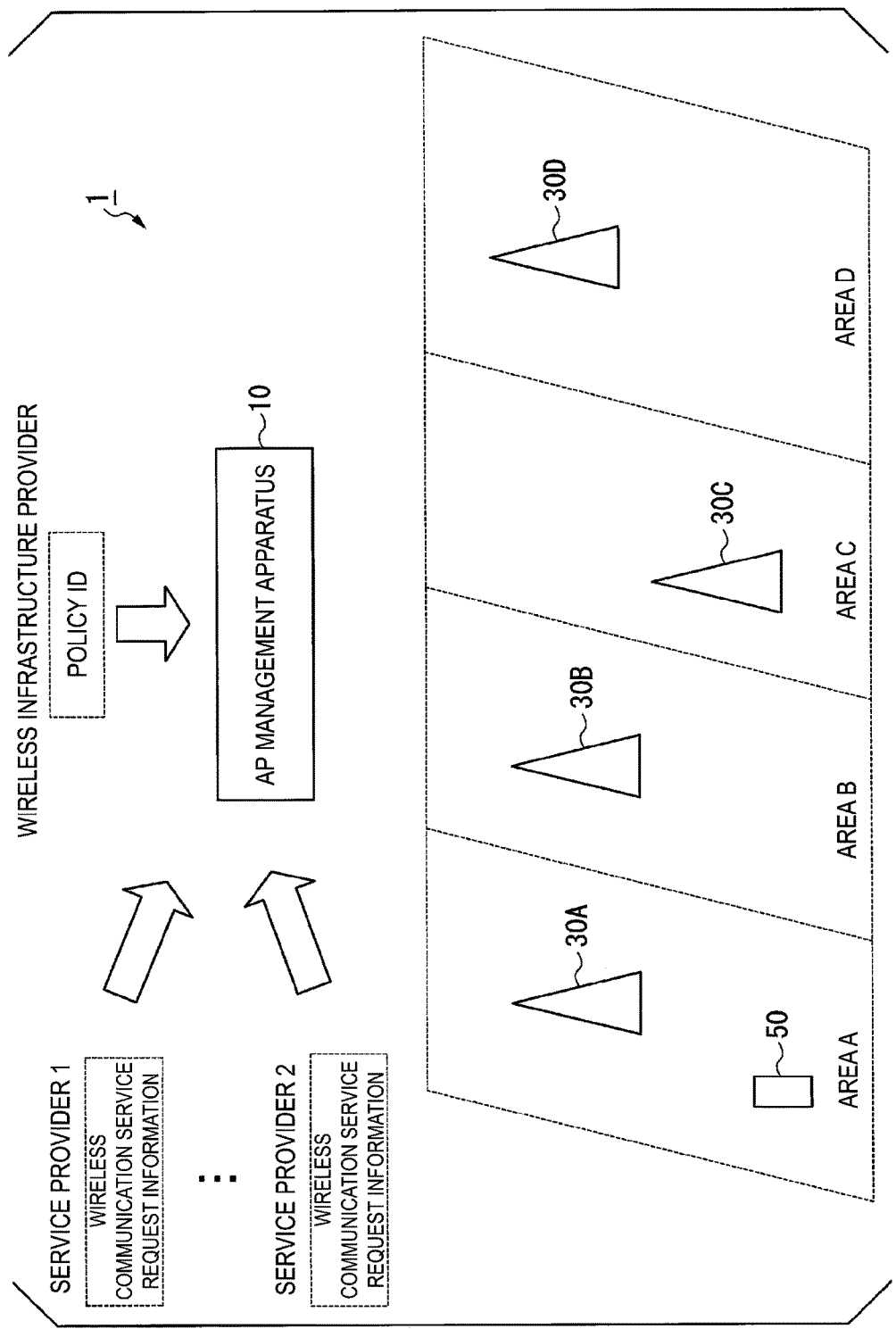
FIG. 1 is a configuration diagram illustrating a system configuration of an AP management system according to a first embodiment of the present disclosure.

FIG. 1 is a configuration diagram illustrating a system configuration of an AP management system according to a first embodiment of the present disclosure. An AP management system 1 includes an AP management apparatus 10, a plurality of APs 30A, 30B, 30C, and 30D, and a radio terminal apparatus 50. The AP management apparatus 10 and each of the plurality of APs 30A, 30B, 30C, and 30D are connected by wireless communication or wired communication. In FIG. 1, each of an area A, an area B, an area C, and an area D refers to an area indicating a section in which any one of the plurality of APs 30A, 30B, 30C, and 30D is installed, and to an area indicating a section in a range in which a wireless communication service is provided. In the following description, the APs 30A, 30B, 30C, and 30D are described as an AP 30 in a case of not being distinguished from each other. In the following description, descriptions will be made on the assumption that the area A, the area B, the area C, and the area D have the same extent.

FIG. 1 illustrates four areas of the area A, the area B, the area C, and the area D. The number of areas may be less than four or may be equal to or more than five. In addition, one area may be provided, and a plurality of APs 30A, 30B, 30C, and 30D may be provided in the one area. FIG. 1 illustrates only one radio terminal apparatus 50. A plurality of radio terminal apparatuses 50 may be provided in the area A, the area B, the area C, and the area D. The number of APs 30A, 30B, 30C, and 30D installed in the area A, the area B, the area C, and the area D is not limited.

The AP management apparatus 10 is an apparatus that manages the AP 30. For example, the AP management apparatus 10 assigns the AP 30 to each area to satisfy the requested condition, based on a policy input from a wireless infrastructure provider and request information for a wireless communication service requested by the plurality of service providers. The AP management apparatus 10 causes the assigned AP 30 to provide a wireless communication service.

The AP 30 is an access point corresponding to SDR. The AP 30 provides a wireless communication service in response to an instruction of the AP management apparatus 10.

Figure 2:
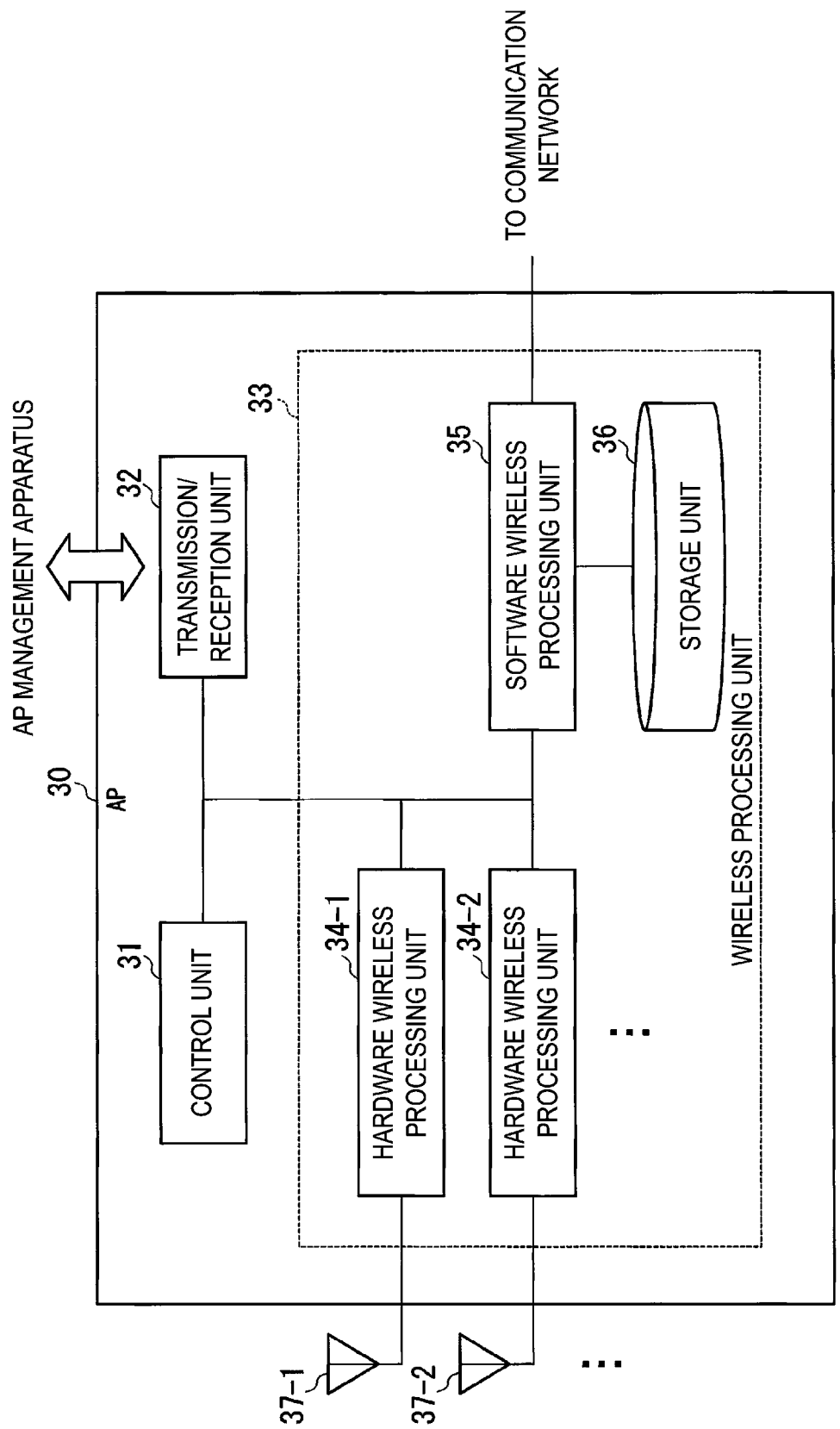
FIG. 2 is a block diagram illustrating a configuration of an AP in the first embodiment.

FIG. 2 is a block diagram illustrating an internal configuration of the AP 30. The AP 30 is an apparatus corresponding to the APs 30A, 30B, 30C, and 30D illustrated in FIG. 1. That is, each of the APs 30A, 30B, 30C, and 30D has the identical internal configuration, and the internal configuration will be described with reference to the AP 30. In the following description, for example, in a case of being described as a transmission/reception unit 32, the transmission/reception unit 32 is assumed to represent a transmission/reception unit 32 in any one of the APs 30A, 30B, 30C, and 30D. In a case where the internal configurations of the APs 30A, 30B, 30C, and 30D are illustrated individually, for example, in a case where the transmission/reception unit 32 of the AP 30A is illustrated, this transmission/reception unit is assumed to be described as a transmission/reception unit 32A.

The AP 30 includes a Central Processing Unit (CPU), a memory, an auxiliary storage device, and the like which are connected to each other by a bus. The AP 30 executes a wireless processing program. The AP 30 executes the wireless processing program to function as an apparatus including a control unit 31, a transmission/reception unit 32, a wireless processing unit 33, and an antenna 37 (37-1, 37-2, . . . ). The entirety or a portion of each function of the AP 30 may be implemented using hardware such as an Application Specific Integrated Circuit (ASIC), a Programmable Logic Device (PLD), and a Field Programmable Gate Array (FPGA). The wireless processing program may be recorded in a computer readable recording medium. The computer readable recording medium refers to, for example, a portable medium such as a flexible disk, a magneto-optical disk, a ROM, and a CD-ROM; and a storage device such as a hard disk, which is mounted in a computer system. The wireless processing program may be transmitted and received via an electrical communication line.

The wireless processing unit 33 includes a plurality of hardware wireless processing units 34-1, 34-2, . . . , a software wireless processing unit 35, and a storage unit 36. In the AP 30, the transmission/reception unit 32 transmits and receives information to and from the AP management apparatus 10.

If the control unit 31 receives a collection request signal from the AP management apparatus 10 through the transmission/reception unit 32, the control unit 31 collects resources of the AP 30, that is, information regarding the hardware wireless processing units 34-1, 34-2, . . . , or information indicating the type of wireless standard provided by the software wireless processing unit 35, from the hardware wireless processing units 34-1, 34-2, . . . , the software wireless processing unit 35, and the storage unit 36. The control unit 31 transmits the collected resource information as AP capacity information, to the AP management apparatus 10 through the transmission/reception unit 32.

If the control unit 31 receives the collection request signal from the AP management apparatus 10 through the transmission/reception unit 32, the control unit 31 collects information indicating use statuses of the hardware wireless processing units 34-1, 34-2, . . . or the use status of a wireless communication service of a wireless standard provided by the software wireless processing unit 35, from the hardware wireless processing units 34-1, 34-2, . . . and the software wireless processing unit 35. The control unit 31 transmits information indicating the collected use status as AP use status information, to the AP management apparatus 10 through the transmission/reception unit 32.

In a case where the control unit 31 receives a request signal from the AP management apparatus 10 through the transmission/reception unit 32, the control unit 31 causes the wireless processing unit 33 to start to provide a wireless communication service of the requested wireless standard, in response to the request signal. For example, in a case where the request signal indicates a request of causing the hardware wireless processing units 34-1, 34-2, . . . being stopped, to start to provide a wireless communication service, the control unit 31 outputs an activation instruction signal for activation to the hardware wireless processing units 34-1, 34-2, . . . as activation targets.

In a case where the request signal indicates a request of starting to provide a wireless communication service of a new wireless standard, the control unit 31 outputs a start instruction signal for reading program data in software of the wireless standard from the storage unit 36 and starting execution, to the software wireless processing unit 35. In a case where the request signal indicates a request of a change such as addition of the details of the provision of the wireless communication service of the wireless standard, which has already been started, the control unit 31 outputs a change instruction signal including the details of the change to the software wireless processing unit 35.

In the wireless communication service, the details of the provision to be added means, for example, that the number of service providing areas or the number of accommodated radio terminal apparatuses 50 is added. Here, the accommodation of the radio terminal apparatus 50 in the AP 30 means that, when the radio terminal apparatus 50 requests a start of a communication, the radio terminal apparatus 50 is in a state of being allowed to be connected to the AP 30. The radio terminal apparatus 50 may not be in a state of being connected to the AP 30 in the current time.

The hardware wireless processing units 34-1, 34-2, . . . is connected to antennae 37-1, 37-2, . . . , respectively. Each of the hardware wireless processing units 34-1, 34-2, . . . includes a radio frequency circuit and a converter. For example, the radio frequency circuit down-converts a reception signal having a frequency band of a radio signal to a frequency band in which the software wireless processing unit 35 performs processing. The radio frequency circuit up-converts a transmission target signal to a frequency band of a radio signal to be transmitted through the antennae 37-1, 37-2, . . . . The converter includes an A/D converter and a D/A converter. The A/D converter converts the analog reception signal down-converted by the radio frequency circuit into a digital signal and outputs the resultant of the conversion to the software wireless processing unit 35. The D/A converter converts the digital signal output by the software wireless processing unit 35 into an analog transmission signal and outputs the resultant of the conversion to the radio frequency circuit. The hardware wireless processing units 34-1, 34-2, . . . activate in accordance with the activation instruction signal from the control unit 31.

The number of hardware wireless processing units 34-1, 34-2, . . . in the AP 30 is appropriately determined in accordance with the number of radio terminal apparatuses 50 to be accommodated. For example, in a case where one hardware wireless processing unit 34-1 has capability of accommodate 300 radio terminal apparatuses 50 maximum, and there is an attempt to accommodate 600 radio terminal apparatuses 50, it is necessary to include at least two or more hardware wireless processing units 34-1 and 34-2.

The storage unit 36 stores program data of software for each of the plurality of wireless standards in advance. If the software wireless processing unit 35 receives a start instruction signal from the control unit 31, the software wireless processing unit 35 reads the program data of the software of the wireless standard indicated by the start instruction signal, from the storage unit 36, and starts digital signal processing of modulation or demodulation in accordance with the wireless standard. If the software wireless processing unit 35 receives a change instruction signal from the control unit 31, the software wireless processing unit 35 performs processing of changing details of the provided contents, for example, adding the number of service providing areas or the number of accommodated radio terminal apparatuses 50 to the wireless communication service of the wireless standard, in which the provision has already started, in accordance with the change instruction signal.

The software wireless processing unit 35 is capable of executing software of two or more wireless standard in parallel. For example, the hardware wireless processing unit 34-1 is switched for a "802.11 g" wireless standard. The software wireless processing unit 35 executes software of "802.11 g" on an input and output signal of the hardware wireless processing unit 34-1 to perform signal processing on the signal. In addition, in a case of providing a wireless communication service for the "802.11 g" wireless standard, another hardware wireless processing unit 34-2 is switched for the "802.11 g" wireless standard. The software wireless processing unit 35 executes the software of "802.11 g" on an input and output signal of the hardware wireless processing unit 34-2 to perform signal processing on the signal. Thus, it is possible to cause one AP 30 to provide wireless communication services of two wireless standards.

Although the software wireless processing unit 35 is capable of executing software programs of two or more wireless standards, it is necessary to switch each of the hardware wireless processing units 34-1, 34-2, . . . for each wireless standard. Thus, for example, in a case where a wireless communication service of the "802.15.4" wireless standard is provided using the hardware wireless processing unit 34-1 for the "802.11 g" wireless standard, it is necessary to switch the "802.11 g" wireless standard to the "802.15.4" wireless standard.

In this case, the software wireless processing unit 35 is caused not to perform processing on an input and output signal of the hardware wireless processing unit 34-1 in accordance with the "802.11 g" wireless standard, and then the hardware wireless processing unit 34-1 is switched for the "802.15.4" wireless standard. The software wireless processing unit 35 is caused to execute the software of "802.15.4" to perform signal processing on an input and output signal of the switched hardware wireless processing unit 34-1. Thus, it is possible to provide a wireless communication service of the "802.15.4" wireless standard by using the hardware wireless processing unit 34-1.

For example, the software wireless processing unit 35 is connected to an external communication network such as the Internet, and transmits the demodulated signal in accordance with a destination address included in the signal. In a case where the software wireless processing unit 35 receives a signal from the communication network, the software wireless processing unit 35 modulates the signal and transmits the signal to a radio terminal apparatus 50 having a destination address included in the signal. Regarding a communication between two radio terminal apparatuses 50 accommodated by the AP 30, the software wireless processing unit 35 does not transmit the demodulated signal to the communication network, and outputs a signal obtained by modulating the demodulated signal again to the hardware wireless processing unit 34-1, 34-2, or . . . that accommodates the radio terminal apparatus 50 having a destination address.

Figure 3:
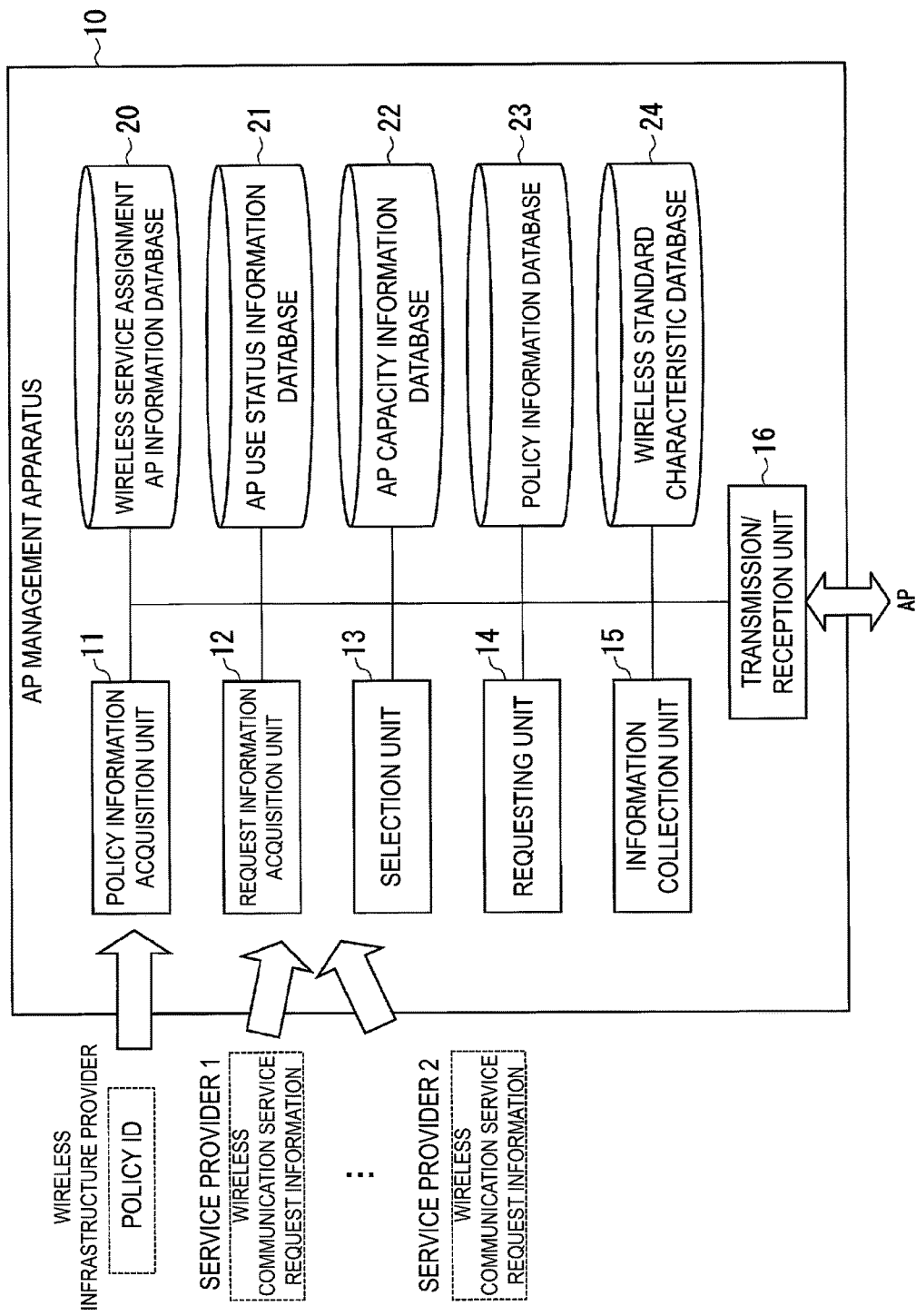
FIG. 3 is a block diagram illustrating an internal configuration and the like of an AP management apparatus in the first embodiment.

FIG. 3 is a block diagram illustrating the internal configuration of the AP management apparatus 10 and the relationship of information transmitted and received between the AP management apparatus 10 and the outside. The AP management apparatus 10 includes a CPU, a memory, an auxiliary storage, and the like connected by a bus, and executes an access point control program. The AP management apparatus 10 executes the access point control program to function as a policy information acquisition unit 11, a request information acquisition unit 12, a selection unit 13, a requesting unit 14, an information collection unit 15, a transmission/reception unit 16, a wireless service assignment AP information database 20, an AP use status information database 21, an AP capacity information database 22, a policy information database 23, and a wireless standard characteristic database 24. The entirety or a portion of each function of the AP management apparatus 10 may be implemented using hardware such as an ASIC, a PLD, and an FPGA. The access point control program may also be recorded in a computer readable recording medium. The computer readable recording medium refers to, for example, a portable medium such as a flexible disk, a magneto-optical disk, a ROM, and a CD-ROM; and a storage device such as a hard disk, which is mounted in a computer system. The access point control program may be transmitted and received via an electrical communication line.

The wireless service assignment AP information database 20 stores a wireless service AP information table 200 illustrated in FIG. 4. Information regarding the provided wireless communication service is registered in the wireless service AP information table 200. The wireless service AP information table 200 has items: "service ID (Identification)", "service provider ID", "service providing area", "wireless standard", "number of service providing terminal apparatuses", "data rate", "allowable delay time", "service start date and time", "service end date and time", "communication interval", "AP-ID in use", and "hardware wireless processing unit ID in use".

Information of an ID assigned by the selection unit 13 for each provided wireless communication service, for example, "Service 1" is written in the "service ID" item. The "service provider ID" item contains information indicating a service provider being a request source for providing a wireless communication service, for example, information of "Provider 1" that is an ID assigned to each service provider in advance. The "service providing area" item contains information indicating an area for requesting provision of a wireless communication service, for example, information of "Area A".

The "wireless standard" item contains information indicating a wireless standard of a wireless communication service requested to be provided, for example, information of "802.11 g". The "number of service providing terminal apparatuses" item contains information indicating the number of radio terminal apparatuses 50 that requests accommodation in a wireless communication service requested to be provided, for example, information of "100". The "data rate" item contains information indicating a communication speed of a wireless communication service requested, for example, information of "1 Mbps". The "allowable delay time" item contains information indicating a time until the radio terminal apparatus 50 connected to the wireless communication service requested to be provided enables a communication after performing a communication start request to the wireless communication service, for example, information of "500 ms".

The "service start date and time" item contains information indicating the date and time on which a start to provide a wireless communication service is requested. The "service end date and time" item contains information indicating the date and time on which an end to provide the wireless communication service is requested. The "communication interval" item contains information indicating the interval of a communication requested in a wireless communication service, for example, information of "normal" or "intermittent". "Normal" indicates a state where communication is normally performed without cutting a connection in the wireless communication service. "Intermittent" indicates a state in which communication is periodically performed in a wireless communication service. For example, in a case of a device which may be capable of periodically communicating, such as a sensor, the "communication interval" item contains information of "intermittent".

In the "AP-ID in use" item contains information of an ID which is assigned to each AP 30 in advance and enables the AP 30 to be uniquely identified, for example, information of "AP1" is written. In the "hardware wireless processing unit ID in use" item, information of an ID assigned to each hardware wireless processing unit 34 in each AP 30, for example, information of "AP1-RF1" is written. As illustrated in FIG. 4, an initial state of the wireless service AP information table 200 is in a state where information or a value is not written in all the items, and the initial state is held until deployment of the wireless communication service is performed.

The AP use status information database 21 stores an AP use status information table 210 illustrated in FIG. 5. In the AP use status information table 210, Information regarding the use status of the AP 30 providing a wireless communication service is registered. The AP use status information table 210 has items: "AP-ID", "installation area", "hardware wireless processing unit ID in use", "wireless standard being provided", "number of accommodated terminal apparatuses", "service providing area", "data rate", and "guaranteed delay time". In the "AP-ID" item, information of an ID of each AP 30, for example, information of "AP1" is written. In the "installation area" item, information indicating an area in which the AP 30 indicated by the "AP-ID" item is installed, for example, information of "Area A" is written.

In the "hardware wireless processing unit ID in use", information of an ID of the hardware wireless processing unit 34, 34, or . . . which is being used in the AP 30 indicated by the "AP-ID" item, for example, information of "AP1-RF1" is written. In the "wireless standard being provided" item, information indicating the wireless standard which is being provided in the AP 30 indicated by the "AP-ID" item, for example, information of "802.11 g" is written.

In the "number of accommodated terminal apparatuses", a value indicating the maximum number of radio terminal apparatuses 50 allowed to be accommodated in the provided wireless communication service is written. In the "service providing area" item, information indicating an area in which a wireless communication service is provided, for example, information of "Area A" is written. In the "data rate" item, information indicating a communication speed of the provided wireless communication service, for example, information of "1 Mbps" is written. In the "guaranteed delay time" item, a value indicating a delay time guaranteed in the provided wireless communication service is written. As illustrated in FIG. 5, an initial state of the AP use status information table 210 is in a state where information or a value is not written in all the items. If the wireless communication service is deployed, information in response to deployment is written in the table.

The AP capacity information database 22 stores an AP capacity information table 220 illustrated in FIG. 6. Information regarding the capacity of the AP 30 is registered in the AP capacity information table 220. The AP capacity information table 220 has items: "AP-ID", "installation area", "position information", "hardware wireless processing unit ID", "wireless standard", "service providing area", "data rate", "guaranteed delay time (100 accommodated terminal apparatuses)", "guaranteed delay time (200 accommodated terminal apparatuses)", and "guaranteed delay time (300 accommodated terminal apparatuses)".

In the "AP-ID" item, information of an ID of each AP 30, for example, information of "AP1" is written. In the "installation area" item, information indicating an area in which the AP 30 indicated by the "AP-ID" item is installed, for example, information of "Area A" is written. In the "position information" item, information indicating a position at which each AP 30 is installed in the area indicated by the "installation area" item, for example, information of latitude and longitude is written.

In the "hardware wireless processing unit ID" item, information of the ID of the hardware wireless processing unit 34A-1, 34A-2, or . . . in the AP 30 indicated by the "AP-ID" item, for example, information of "AP1-RF1" is written. In the "wireless standard" item, information indicating a wireless standard provided by the hardware wireless processing unit 34A-1, 34A-2, or . . . in the AP 30 indicated by the "AP-ID" item, for example, information of "802.11g" is written. In the "service providing area" item, information indicating an area in which the AP 30 indicated by the "AP-ID" item provides a wireless communication service, for example, information of "Area A" is written. In the "data rate" item, information indicating the communication speed of each wireless communication service provided by the AP 30 indicated by the "AP-ID" item, for example, information of "1 Mbps" is written.

In the "guaranteed delay time (100 accommodated terminal apparatuses)", a value indicating a delay time guaranteed in a case where 100 radio terminal apparatuses 50 are connected to each wireless communication service provided by the AP 30 indicated by the "AP-ID" item is written. Similarly, in the "guaranteed delay time (200 accommodated terminal apparatuses)" and the "guaranteed delay time (300 accommodated terminal apparatuses)", respectively, values indicating delay times guaranteed in a case where 200 radio terminal apparatuses 50 are connected to the wireless communication service provided by the AP 30 indicated by the "AP-ID" item and a case where 300 radio terminal apparatuses 50 are connected to the wireless communication service are written.

As the number of radio terminal apparatuses 50 to be accommodated increases, resources such as bands are shared by more radio terminal apparatuses 50. Thus, the value of the guaranteed delay time also increases. An initial state of the AP capacity information table 220 is in a state where information or values are not written in all the items. Once AP capacity information is collected by the information collection unit 15, information corresponding to the configuration of the AP 30 at each collection time point is written in the AP capacity information table 220.

For example, in FIG. 6, four AP-IDs (AP1, AP2, AP3, and AP4) are illustrated in the "AP-ID" item. For convenience of description, it is assumed that AP1 corresponds to the AP 30A, AP2 corresponds to the AP 30B, AP3 corresponds to the AP 30C, and AP4 corresponds to the AP 30D. It is illustrated that the AP 30A includes one hardware wireless processing unit 34A referring to as "AP1-RF1". It is illustrated that the hardware wireless processing unit 34A "AP1-RF1" can provide wireless communication services of wireless standards being "802.11 g" and "LoRa (registered trademark)" in a manner that the software wireless processing unit 35 reads program data in software from the storage unit 36.

Regarding the wireless communication service of the wireless standard "802.11 g", it is illustrated that the wireless communication service is provided at a data rate of 10 Mbps in Area A.

Regarding the wireless communication service of the wireless standard "LoRa", it is illustrated that the wireless communication service is provided at a data rate of 1 kbps in four areas being the area A, the area B, the area C, and the area D.

In addition, FIG. 6 illustrates the followings. In a case where the wireless communication service of the "802.11 g" wireless standard provided by the hardware wireless processing unit 34A "AP1-RF1" is provided in the area A, if the number of radio terminal apparatuses 50 to be accommodated is 100, the wireless communication service has a guaranteed delay time of 100 milliseconds (ms). If the number of radio terminal apparatuses 50 to be accommodated is 200, the wireless communication service has a guaranteed delay time of 200 milliseconds (ms). If the number of radio terminal apparatuses 50 to be accommodated is 300, the wireless communication service has a guaranteed delay time of 300 milliseconds (ms).

The policy information database 23 stores a policy information table 230 illustrated in FIG. 7. Information related to a policy is registered in the policy information table 230. The policy information table 230 has items of "policy ID", "selection flag", and "policy content". In the "policy ID" item, information of a policy ID assigned to each policy in advance, for example, information of "Policy A" is written. In the "selection flag" item, information indicating the selected "policy ID" item is written. For example, in a case where being selected is represented, "selected" is written. In a case where it is represented that selection is not performed, "not selected" is written.

Because any one of policies is selected, one policy is "selected", and other policies are "not selected". In the "policy content" item, an explanation indicating the plan of processing of selecting the AP 30, which is performed in each policy which is used as a reference by a user of the AP management apparatus 10 later is written. Regarding information of the "policy ID" and "policy content" stored in the policy information table 230, for example, when an algorithm of a selection procedure by a new policy is added in the selection unit 13 by an operator of the AP management apparatus 10, an operation of the operator is received corresponding to the addition, a new policy ID is assigned, and information is added in the "policy ID" item and "policy content" item.

For example, FIG. 7 illustrates that information on two policies being Policy A and Policy B has been written, and that Policy A is selected. As the explanation of Policy A, "emphasizing sharing of the hardware wireless processing unit of the AP in use between wireless communication services" is written. As the explanation of Policy B, "emphasizing separation of the hardware wireless processing units in the AP for each wireless communication service" is written. The contents will be described in conjunction with describing the processing of selecting the AP 30 by Policy A and Policy B.

The wireless standard characteristic database 24 stores a wireless standard characteristic table 240 illustrated in FIG. 8. Information regarding a wireless standard is registered in the wireless standard characteristic table 240. The wireless standard characteristic table 240 has items of "wireless standard", "number of service providing terminal apparatuses", "data rate", "maximum delay time", and "maximum communication available range". Information indicating a wireless standard, for example, information of "802.11 g" is included in the "wireless standard" item. In the "number of service providing terminal apparatuses" item, information indicating the number of radio terminal apparatuses 50 allowed to be accommodated in the wireless standard indicated by the "wireless standard" item, for example, information of "300" is written. In the "data rate" item, information indicating a communication speed of a wireless communication service allowed to be provided in the wireless standard indicated by the "wireless standard" item, for example, information of "10 Mbps" is written.

In the "maximum delay time" item, information indicating the maximum time until a communication is possible after the radio terminal apparatus 50 that attempts to communicate in the wireless standard indicated by the "wireless standard" item performs a communication start request, for example, information of "500 ms" is written. In the "maximum communication available" item, information indicating the maximum communication range allowed to be provided in the wireless standard indicated by the "wireless standard" item, for example, information of "1" is written. In this item, as the value of "maximum communication available" decreases, the maximum communication range allowed to be provided becomes narrower. That is, the wireless standard characteristic table 240 illustrated in FIG. 8 shows that a communication range allowed to be provided by the wireless standard "LoRa" is widest, and a communication range allowed to be provided by the wireless standard "802.11 g" is narrowest.

Returning to FIG. 3, the policy information acquisition unit 11 acquires a policy ID by receiving an input operation from a wireless infrastructure provider, for example. If the policy information acquisition unit acquires the policy ID, the policy information acquisition unit 11 rewrites information in the "selection flag" item corresponding to the acquired policy ID to "selected", and rewrites information in the "selection flag" item corresponding to other policy IDs to "not selected", with reference to the policy information table 230. The policy information acquisition unit 11 and an operation device of the wireless infrastructure provider may be connected to each other via a communication line. In this manner, the wireless infrastructure provider may operate the operation device to transmit a policy ID, and the policy information acquisition unit 11 may acquire the policy ID by receiving the policy ID via the communication line. Thus, the wireless infrastructure provider can remotely rewrite the policy information table 230.

The request information acquisition unit 12 receives an operation input by an operator of each of a plurality of service providers that provide wireless communication services, and acquires request information for the wireless communication service requested by the service provider. The request information acquisition unit 12 outputs the acquired request information to the selection unit 13.

The request information acquisition unit 12 may be connected to the operation device in each of the plurality of service provider via the communication line. In this manner, the operator of each service provider may operate the operation device to transmit the request information, and the request information acquisition unit 12 may receive and acquire the request information via the communication line. Thus, the operator of each service provider can remotely request the deployment of the wireless communication service.

The request information has a data configuration illustrated in FIG. 9, for example. The request information includes items: "service provider ID", "service providing area", "wireless standard", "number of service providing terminal apparatuses", "data rate", "allowable delay time", "service start date and time", "service end date and time", and "communication interval". The "service provider ID" item contains information indicating a service provider being a request source for providing a wireless communication service, for example, information of "Provider 1" that is an ID assigned to each service provider in advance. The "service providing area" item contains information indicating an area for requesting provision of a wireless communication service, for example, information of "Area A". The "wireless standard" item contains information indicating a wireless standard of a wireless communication service requested to be provided, for example, information of "802.11 g". The "number of service providing terminal apparatuses" item contains information indicating the number of radio terminal apparatuses 50 that requests accommodation in a wireless communication service requested to be provided, for example, information of "100".

The "data rate" item contains information indicating a communication speed of a wireless communication service for which provision is requested, for example, information of "1 Mbps". The "allowable delay time" item contains information indicating a time until the radio terminal apparatus 50 connected to the wireless communication service requested to be provided enables a communication after performing a communication start request to the wireless communication service, for example, information of "500 ms". The "service start date and time" item contains information indicating the date and time on which a start to provide a wireless communication service is requested, for example, information of "2018/4/1 11:00:00". The "service end date and time" item contains information indicating the date and time on which an end to provide the wireless communication service is requested, for example, information of "2018/4/2 15:00:00". The "communication interval" item contains information indicating the interval of a communication requested in a wireless communication service, for example, information of "normal" or "intermittent".

That is, the request information illustrated in FIG. 9 indicates that the provider being the source of requesting request information is a service provider of "Provider 1", and the provider requests the provision of a wireless communication service in "Area A". In addition, the request information illustrated in FIG. 9 indicates that providing a wireless communication service capable of accommodating "100" radio terminal apparatuses 50 in maximum is requested in conditions in which the wireless standard is "802.11 g", the communication speed is "1 Mbps", the allowable delay time is "500 milliseconds", the date and time on which a start to provide the wireless communication service is requested is "2018/4/1 11:00:00", the date and time on which an end to provide the wireless communication service is requested is "2018/4/2 15:00:00", and the communication interval of being requested is "normal".

The selection unit 13 selects the hardware wireless processing unit 34-1, 34-2, or . . . of the AP 30, which satisfies the conditions indicated by the request information, based on the request information output by the request information acquisition unit 12, the information stored in the AP use status information table 210, information stored in the AP capacity information table 220, information stored in the policy information table 230, and the wireless standard characteristic table 240.

When the selection unit 13 selects the hardware wireless processing unit 34-1, 34-2, or . . . in the AP 30, which satisfies the conditions indicated by the request information, the selection unit 13 stores the request information in a scheduling buffer corresponding to the start date, or the date and time of the wireless communication service, which is included in the request information. The scheduling buffer is a storage region for temporarily storing the request information. The scheduling buffer is prepared for each predetermined period, for example, every day. Each scheduling buffer has a buffer lifetime defined in advance. If the lifetime expires, the service deployment is executed in a sorted order in the scheduling buffer. The buffer lifetime indicates a period during which the request information is stored in the scheduling buffer. The scheduling buffer is a storage region provided in the selection unit 13.

FIG. 10 and FIG. 11 are diagrams illustrating a data configuration of the scheduling buffer in the first embodiment.

The scheduling buffer illustrated in FIG. 10 stores request information in which a start date of a wireless communication service is on Apr. 1, 2018. The scheduling buffer illustrated in FIG. 11 stores request information in which a start date of a wireless communication service is on Apr. 2, 20181. As described above, each scheduling buffer stores the request information acquired during a prescribed period. "Service ID" is assigned to each piece of request information. The information stored in the scheduling buffer has been described above, and thus repetitive description will be omitted.

The selection unit 13 determines a processing order of the request information in accordance with the priority and sorts the request information in order corresponding to the determined processing order, with reference to the request information stored in the scheduling buffer. The selection unit 13 sorts the request information in the scheduling buffer every time the request information is stored in the scheduling buffer. In a case where the lifetime of any scheduling buffer has expired, the selection unit 13 selects the hardware wireless processing unit 34-1, 34-2, or . . . in the AP 30, which satisfies conditions indicated by the request information, among all pieces of request information in the scheduling buffer having the expired lifetime, in ascending order of the processing order after sorting. The selection unit performs the selection based on information stored in the AP use status information table 210 in the AP use status information database 21, information stored in the AP capacity information table 220 in the AP capacity information database 22, and information stored in the policy information table 230 in the policy information database 23.

The requesting unit 14 generates a request signal for the hardware wireless processing unit 34-1, 34-2, or . . . in the AP 30, which has been selected by the selection unit 13, based on the content indicated in the request information. The requesting unit 14 transmits the generated request signal to the target AP 30 through the transmission/reception unit 16. When the request information acquisition unit 12 acquires new request information, the information collection unit 15 transmits AP capacity information, AP use status information, and a collection request signal for collecting wireless type characteristic information, to the control unit 31 of the AP 30 through the transmission/reception unit 16. The transmission/reception unit 16 transmits and receives information to and from the transmission/reception unit 32 of the AP 30.

Figure 12:
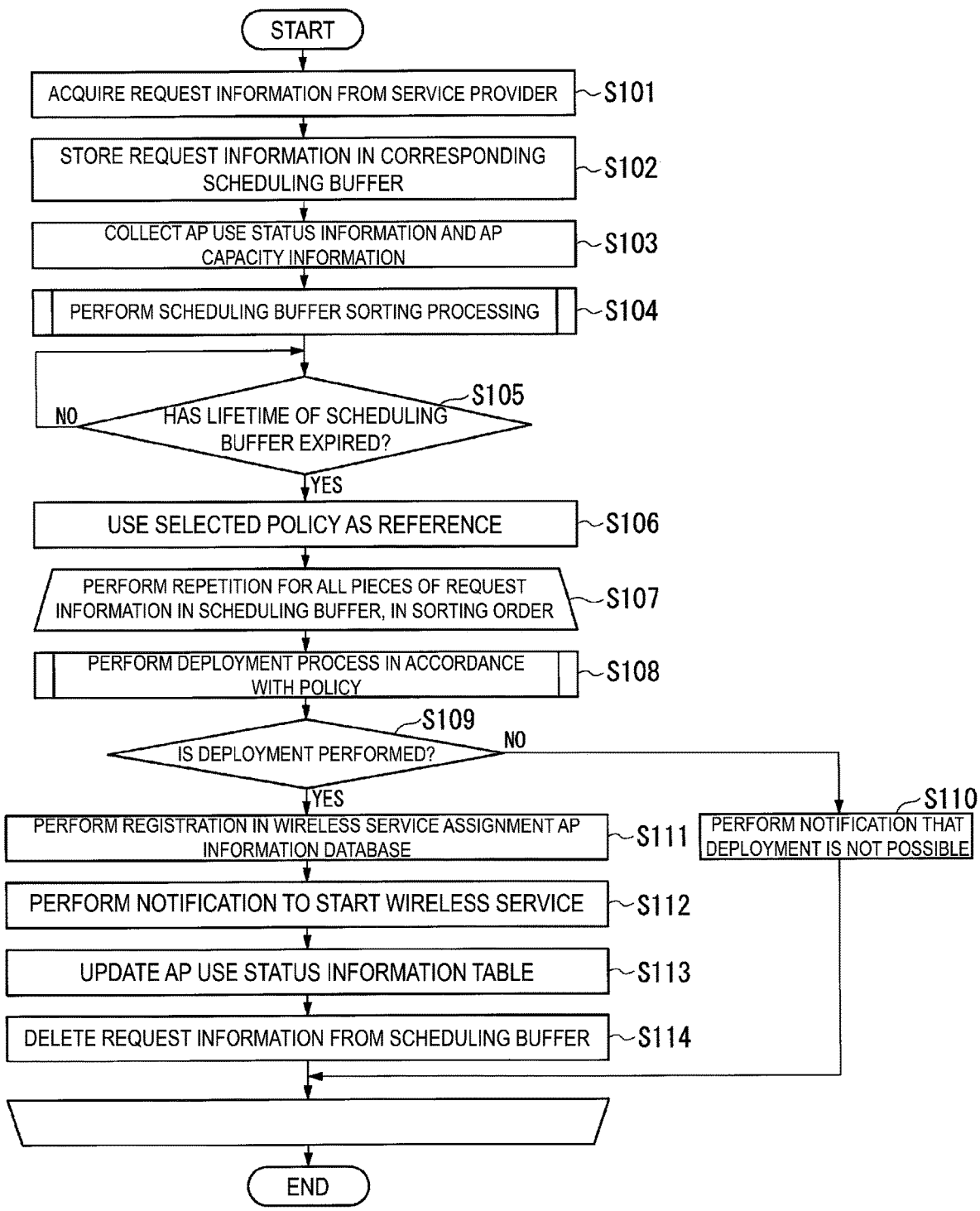
FIG. 12 is a flowchart illustrating deployment processing of a wireless communication service in the first embodiment.

Deployment Processing of Wireless Communication Service in First Embodiment FIG. 12 is a flowchart illustrating deployment processing of a wireless communication service, which is performed by the AP management system 1. Before the processing illustrated in FIG. 12 is started, the policy information acquisition unit 11 in the AP management apparatus 10 acquires a policy ID by receiving an operation input of a wireless infrastructure provider. Here, it is assumed that the wireless infrastructure provider has input Policy A by an operation. If the policy information acquisition unit 11 acquires an ID of Policy A, the policy information acquisition unit 11 rewrites information in the "selection flag" item in a record of the policy information table 230, in which "policy ID" is "Policy A", to "selected", and rewrites information in the "selection flag" item in other records to "not selected". The request information acquisition unit 12 acquires request information by receiving an operation input by an operator of any service provider. The request information acquisition unit 12 outputs the acquired request information to the selection unit 13 (Step S101).

The selection unit 13 stores the request information output from the request information acquisition unit 12, in the scheduling buffer (Step S102). Specifically, the selection unit 13 stores the request information in the scheduling buffer corresponding to the service start date or date and time included in the request information, with reference to the request information output from the request information acquisition unit 12. For example, in a case where the service start date included in the request information is on Apr. 1, 2018, the selection unit 13 stores request information in which the service start date is on Apr. 1, 2018, in the scheduling buffer for storing the request information in which the service start date is on Apr. 1, 2018. At this time, the selection unit 13 assigns a service ID to the request information and stores the request information in the scheduling buffer. In the description with reference to FIG. 12, it is assumed that, in the scheduling buffer, request information corresponding to service IDs of "1", "2", and "3" illustrated in FIG. 10 is already stored, and that the selection unit 13 assigns a service ID of "4" to new request information output from the request information acquisition unit 12, and stores the request information in the scheduling buffer.

If the request information acquisition unit 12 acquires the request information, the information collection unit 15 collects AP use status information and AP capacity information (Step S103). Specifically, the information collection unit 15 transmits a collection request signal to all APs 30 through the transmission/reception unit 16. The control units 31 in all the APs 30 collect the AP use status information and the AP capacity information from the wireless processing units 33. The control unit 31 transmits the AP use status information and the AP capacity information which have been collected, to the AP management apparatus 10 through the transmission/reception unit 32. The information collection unit 15 in the AP management apparatus 10 writes and stores the AP use status information received through the transmission/reception unit 16, in the AP use status information table 210 of the AP use status information database 21. The information collection unit 15 writes and stores the received AP capacity information in the AP capacity information table 220 of the AP capacity information database 22.

Then, the selection unit 13 performs scheduling buffer sorting (Step S104). The scheduling buffer sorting process is processing of sorting request information stored in the scheduling buffer. The selection unit 13 performs the scheduling buffer sorting processing in the scheduling buffer in which the request information is stored. The scheduling buffer sorting processing will be specifically described with reference to FIG. 13.

Then, the selection unit 13 determines whether the lifetime of any scheduling buffer has expired (Step S105). That is, the selection unit 13 compares the current date and time to the lifetime defined in the scheduling buffer, and determines whether there is the scheduling buffer for which the current date and time has passed the lifetime. In a case where there is the scheduling buffer for which the current date and time has passed the lifetime, the selection unit 13 determines that the lifetime of any scheduling buffer has expired.

In a case where there is no scheduling buffer for which the current date and time has passed the lifetime, the selection unit 13 determines that the lifetimes of all scheduling buffers do not expire. In a case where the lifetimes of all scheduling buffers do not expire (NO in Step S105), the selection unit 13 waits until the lifetime of any scheduling buffer has expired.

In a case where the lifetime of any scheduling buffer has expired (YES in Step S105), the selection unit 13 performs processes subsequent to Step S106 by using the scheduling buffer for which the lifetime has expired. In a case where new request information is acquired, the AP management apparatus 10 performs processes subsequent to Step S101.

In a case where the lifetime of any scheduling buffer has expired, the selection unit 13 reads the "policy ID" in a record in which the "selection flag" is "selected", with reference to the policy information table 230 (Step S106). The AP management apparatus 10 performs processes subsequent to Step S108 in sorted order of all pieces of request information stored in the scheduling buffer for which the lifetime has expired (Step S107).

The selection unit 13 calls a subroutine of an algorithm of a selection procedure corresponding to the read policy ID and starts processing of the called subroutine (Step S108). Here, it is assumed that the policy information table 230 is in the state illustrated in FIG. 7. The selection unit 13 performs the subroutine of an algorithm for the selection procedure of Policy A. That is, the selection unit 13 performs deployment processing of a wireless communication service, based on the scheduling buffer for which the lifetime has expired and Policy A. The deployment processing of the wireless communication service based on Policy A will be described later.

After the deployment processing of the wireless communication service based on Policy A, the selection unit 13 determines whether the wireless communication service requested by the request information has been deployed (Step S109). In a case where information indicating that deployment of the wireless communication service requested by the request information is not possible is stored in an internal storage region, the selection unit 13 determines that deployment is not performed (No in Step S109), and outputs the information indicating that deployment is not possible, to the request information acquisition unit 12. The request information acquisition unit 12 outputs information of notifying the operator of the service provider as the requesting source, for example, to a screen of the operation device operated by the operator (Step S110). Then, the processing is ended.

In a case where it is determined that the wireless communication service requested by the request information has been deployed (YES in Step S109), the selection unit 13 registers the information in the wireless service AP information table 200 (Step S111). Then, the request information acquisition unit 12 outputs a notification indicating the start of the wireless communication service to the operator of the service provider as the requesting source, for example, to the screen of the operation device operated by the operator (Step S112).

The selection unit 13 updates the AP use status information table 210 in accordance with the start of operating the wireless communication service (Step S113). The selection unit 13 deletes the request information which has satisfied the condition to cause providing of the wireless communication service to start, from the scheduling buffer (Step S114). In a case where the processes subsequent to Step S108 are ended for all pieces of request information stored in the scheduling buffer for which the lifetime has expired, the selection unit 13 ends the processing illustrated in FIG. 12.

Figure 13:
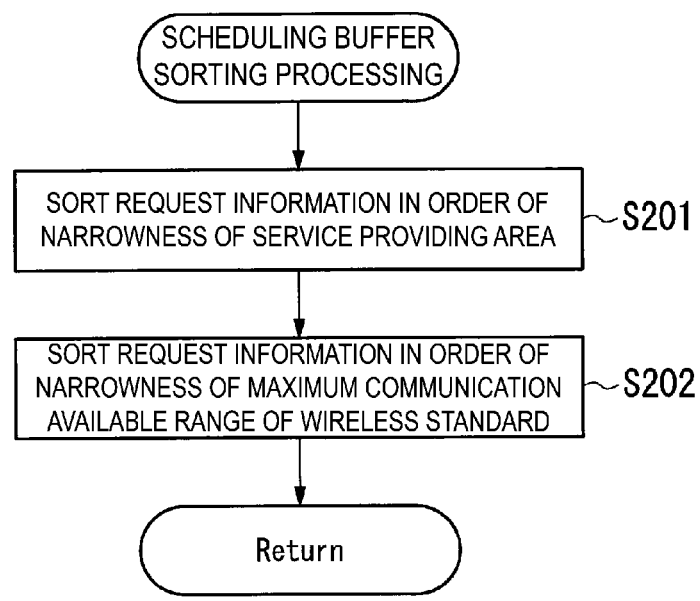
FIG. 13 is a flowchart illustrating scheduling buffer sorting processing in the first embodiment.

FIG. 13 is a flowchart illustrating the scheduling buffer sorting processing in the first embodiment.

Firstly, the selection unit 13 sorts each piece of request information stored in the scheduling buffer (for example, request information illustrated in FIG. 10) in order of narrowness of service providing area (Step S201). In the example illustrated in FIG. 10, in the request information stored in the scheduling buffer, the service providing area requested by the provider of "3" is four being the area A, the area B, the area C, and the area D. The service providing area requested by the provider of "2" is two being the area B and the area C. The service providing area requested by the provider of "4" is one being the area A. The service providing area requested by the provider of "1" is one being the area A.

In the present embodiment, the extents of the area A, the area B, the area C, and the area D are equal to each other. Thus, if the selection unit 13 sorts the request information in order of narrowness of service providing area, sorting is performed in order of the service ID of "3", the service ID of "4", the service ID of "2", and the service ID of "1". The selection unit 13 may determine the extent of the service providing area based on the actual extent of the area or may be determined by the number of areas.

The selection unit 13 sorts each piece of the request information stored in the scheduling buffer in order of narrowness of the maximum communication available range of the wireless standard (Step S202). Specifically, the selection unit 13 reads the wireless standard characteristic table 240 from the wireless standard characteristic database 24. Then, the selection unit 13 determines the maximum communication available range in each piece of request information, based on the wireless standard included in the request information and the "maximum communication available range" of each wireless standard in the read wireless standard characteristic table 240.

For example, because the wireless standard of the request information to which the service ID of "1" is assigned is "LoRa", and the maximum communication available range of "LoRa" is "3", the selection unit 13 determines that the maximum communication available range of the request information to which the service ID of "1" is assigned is "3". In addition, because the wireless standard of the request information to which the service ID of "2" is assigned is "802.11 ah", and maximum communication available range of "802.11 ah" is "2", the selection unit 13 determines that the maximum communication available range of the request information to which the service ID of "2" is assigned is "2". In addition, because the wireless standard of the request information to which the service ID of "3" is assigned is "802.11 g", and maximum communication available range of "802.11 g" is "1", the selection unit 13 determines that the maximum communication available range of the request information to which the service ID of "3" is assigned is "1". In addition, because the wireless standard of the request information to which the service ID of "4" is assigned is "802.11 g", and maximum communication available range of "802.11 g" is "1", the selection unit 13 determines that the maximum communication available range of the request information to which the service ID of "4" is assigned is "1".

The selection unit 13 sorts the sorted request information in order of narrowness of the maximum communication available range of the wireless standard, based on the determination result. At this time, the selection unit 13 sorts the request information, maintaining the arrangement in order of narrowness of the service providing area, such that the request information is sorted in order that the maximum communication available range of the wireless standard is narrow. That is, the selection unit 13 sorts the request information such that request information in which the service providing area is narrowest, and the maximum communication available range of the wireless standard is narrowest is processed first. In a case of this example, the order of the narrow service providing area is an order of the service ID of "3", the service ID of "4", the service ID of "2", and the service ID of "1". The order that the maximum communication available range of the wireless standard is narrow is an order of the service ID of "3", the service ID of "4", the service ID of "2", and the service ID of "1". Thus, the selection unit 13 sorts the request information in order of the service ID of "3", the service ID of "4", the service ID of "2", and the service ID of "1".

A case where the wireless standard of the request information to which the service ID of "3" is assigned is "802.11 ah" will be described. In this case, the maximum communication available range of the wireless standard included in the request information to which the service ID of "3" is assigned is identical to the maximum communication available range of the wireless standard included in the request information to which the service ID of "2". However, the service providing area in the request information to which the service ID of "3" is assigned is narrower than the service providing area in the request information to which the service ID of "2" is assigned. Thus, the selection unit 13 sets a processing priority of the request information to which the service ID of "3" is assigned to be higher than the processing priority of the request information to which the service ID of "2" is assigned. The service providing area included in the request information to which the service ID of "3" is assigned is identical to the service providing area included in the request information to which the service ID of "4".

However, the maximum communication available range of the wireless standard in the request information to which the service ID of "3" is assigned is wider than the maximum communication available range of the wireless standard in the request information to which the service ID of "4" is assigned. Thus, the selection unit 13 sets a processing priority of the request information to which the service ID of "4" is assigned to be higher than the processing priority of the request information to which the service ID of "3" is assigned. Based on the above points, the selection unit 13 sorts the request information in order of the service ID of "4", the service ID of "3", the service ID of "2", and the service ID of "1".

After the process in Step S202, the selection unit 13 assigns information indicating the processing order, for example, "1" to each piece of request information, as illustrated in FIG. 14. FIG. 14 is a diagram illustrating a specific example of the scheduling buffer after sorting processing in the first embodiment. As illustrated in FIG. 14, the processing order is illustrated as follows. The processing orders of two pieces of request information being the request information to which the service ID of "3" is assigned and the request information to which the service ID of "4" is assigned are "1". The processing order of the request information to which the service ID of "2" is assigned is "2", and the processing order of the request information to which the service ID of "1" is assigned is "3".

Figure 15:
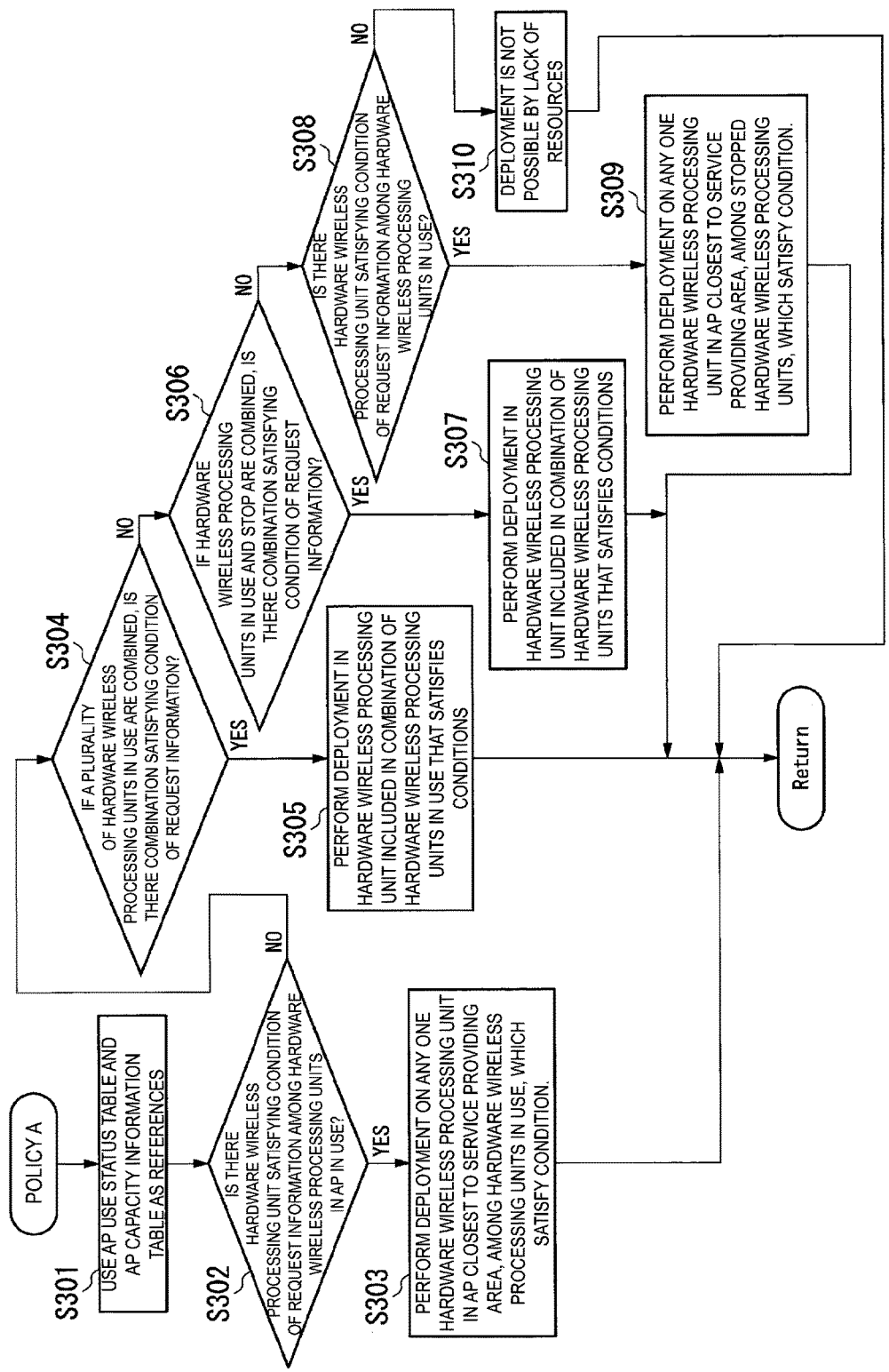
FIG. 15 is a flowchart illustrating deployment processing of the wireless communication service by Policy A in the first embodiment.

Next, the deployment processing of the wireless communication service based on Policy A will be described with reference to FIG. 15 to FIG. 17. FIG. 15 is a flowchart illustrating the deployment processing of the wireless communication service based on Policy A. The processing in FIG. 15 is performed in ascending order of the processing order stored in the scheduling buffer.

The selection unit 13 uses the AP use status information table 210 and the AP capacity information table 220 as references (Step S301). The selection unit 13 detects the hardware wireless processing unit 34-1, 34-2, or . . . in use, based on the information stored in the AP use status information table 210. The selection unit 13 determines whether the hardware wireless processing unit 34-1, 34-2, or . . . satisfying the conditions indicated by the request information, that is, conditions indicated by the items of "service providing area", "wireless standard", "number of service providing terminal apparatuses", "data rate", and "allowable delay time" is provided among the detected hardware wireless processing units 34-1, 34-2, . . . in use. The selection unit 13 performs determination based on the information stored in the AP capacity information table 220 (Step S302).

In a case where the selection unit 13 determines that the hardware wireless processing unit satisfying the condition indicated by the request information is provided among the detected hardware wireless processing units 34-1, 34-2, . . . in use (YES in Step S302), the selection unit 13 reads position information of the AP 30 including the hardware wireless processing unit 34-1, 34-2, or . . . satisfying the condition, from the "position information" item in the AP capacity information table 220. The selection unit 13 selects the AP 30 closest to an area indicated by the "service providing area" item in the request information, based on the read position information. For example, a center point of an area, or a reference point which has been predetermined for each area is applied as the reference point of the area when a distance is calculated. The selection unit 13 selects any one hardware wireless processing unit 34-1, 34-2, or . . . satisfying the condition among the hardware wireless processing units 34-1, 34-2, . . . included in the selected AP 30, as a deployment target for the wireless communication service.

In the closest AP 30, in a case where there are a plurality of hardware wireless processing units 34-1, 34-2, . . . satisfying the conditions, the selection unit 13 randomly selects any one of the plurality of hardware wireless processing units. In a case where there is one hardware wireless processing unit 34-1, 34-2, or . . . satisfying the condition in Step S302, the selection unit 13 does not need to select the closest AP 30 based on the position information, and the selection unit 13 selects the one hardware wireless processing unit 34-1, 34-2, or . . . as a deployment target for the wireless communication service.

The requesting unit 14 generates a request signal based on the request information and the hardware wireless processing unit ID indicating the selected hardware wireless processing unit 34-1, 34-2, or . . . . The requesting unit 14 transmits the generated request signal to the AP 30 including the hardware wireless processing unit 34-1, 34-2, or . . . selected by the selection unit 13, through the transmission/reception unit 16. If the control unit 31 in the AP 30 receives the request signal through the transmission/reception unit 32, the control unit 31 performs deployment of the wireless communication service on the hardware wireless processing unit 34-1, 34-2, . . . corresponding to the hardware wireless processing unit ID included in the request signal, in accordance with the request signal (Step S303). Then, the control unit 31 ends the subroutine of Policy A.

In a case where the selection unit 13 determines that there is no hardware wireless processing unit satisfying the condition indicated by the request information among the detected hardware wireless processing units 34-1, 34-2, . . . in use (NO in Step S302), the selection unit 13 combines the hardware wireless processing units 34-1, 34-2, . . . in use and determines whether there is a combination satisfying the condition indicated by the request information (Step S304). When the selection unit 13 generates the combination, the selection unit 13 sequentially selects the hardware wireless processing units 34-1, 34-2, . . . in use, which are provided in the AP 30 close to the area indicated in the "service providing area" item of the request information to generate a combination. The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13 determines that there is a combination of the hardware wireless processing unit 34-1, 34-2, . . . in use, which satisfies the condition indicated by the request information (YES in Step S304), the selection unit 13 selects all of the hardware wireless processing unit 34-1, 34-2, . . . included in the combination, as a deployment target for the wireless communication service. The requesting unit 14 generates a request signal for each of hardware wireless processing units 34-1, 34-2, . . . included in the combination selected by the selection unit 13. Allocation of resources for each hardware wireless processing unit 34-1, 34-2, . . . is required when the selection unit 13 generates the combination. Thus, the requesting unit 14 generates the request signal in accordance with the allocation of the resources, which is required by the selection unit 13.

The requesting unit 14 transmits the generated request signal for each hardware wireless processing unit 34-1, 34-2, . . . to the AP 30 including the hardware wireless processing units 34-1, 34-2, . . . included in the combination, through the transmission/reception unit 16. If the control unit 31 in each AP 30 receives the request signal through the transmission/reception unit 32, the control unit 31 performs deployment of the wireless communication service on the hardware wireless processing unit 34-1, 34-2, . . . corresponding to the hardware wireless processing unit ID included in the request signal, in accordance with request information included in the request signal (Step S305). Then, the control unit 31 ends the subroutine of Policy A.

In a case where the selection unit 13 determines that there is no combination of the hardware wireless processing unit 34-1, 34-2, . . . in use that satisfies the condition indicated by the request information (NO in Step S304), the selection unit 13 detects the stopped hardware wireless processing unit 34-1, 34-2, . . . based on the information stored in the AP use status information table 210 and the information stored in the AP capacity information table 220. The selection unit 13 combines the hardware wireless processing units 34-1, 34-2, . . . which are in use or are stopped, and determines whether there is a combination satisfying the condition indicated by the request information (Step S306).

When the selection unit 13 generates the combination, the selection unit 13 preferentially generates a combination of the hardware wireless processing unit 34-1, 34-2, . . . in use such that a combination of only the stopped hardware wireless processing unit 34-1, 34-2, . . . is not generated. When the selection unit 13 generates the combination, the selection unit 13 sequentially selects the hardware wireless processing units 34-1, 34-2, . . . provided in the AP 30 close to the area indicated in the "service providing area" item of the request information to generate a combination. The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13 determines that there is a combination of the hardware wireless processing unit 34-1, 34-2, . . . in use and stop, which satisfies the condition indicated by the request information (YES in Step S306), the selection unit 13 selects all of the hardware wireless processing unit 34-1, 34-2, . . . included in the combination, as a deployment target for the wireless communication service. The requesting unit 14 generates a request signal for each of hardware wireless processing units 34-1, 34-2, . . . included in the combination selected by the selection unit 13. Allocation of resources for each hardware wireless processing unit 34-1, 34-2, . . . is required when the selection unit 13 generates the combination. Thus, the requesting unit 14 generates the request signal in accordance with the allocation of the resources, which is required by the selection unit 13.

The requesting unit 14 transmits the generated request signal for each hardware wireless processing unit 34-1, 34-2, . . . to the AP 30 including the hardware wireless processing units 34-1, 34-2, . . . included in the combination, through the transmission/reception unit 16. If the control unit 31 in each AP 30 receives the request signal through the transmission/reception unit 32, the control unit 31 performs deployment of the wireless communication service on the hardware wireless processing unit 34-1, 34-2, . . . corresponding to the hardware wireless processing unit ID included in the request signal, in accordance with request information included in the request signal. The control unit 31 outputs an activation instruction signal to the stopped hardware wireless processing unit 34-1, 34-2, . . . to activate the stopped hardware wireless processing unit 34-1, 34-2, . . . . After the activation, the control unit 31 performs deployment of the wireless communication service in accordance with the request information included in the request signal (Step S307). Then, the control unit 31 ends the subroutine of Policy A.

In a case where the selection unit 13 determines that there is no combination of the hardware wireless processing unit 34-1, 34-2, . . . in use or stop, which satisfies the condition indicated by the request information (NO in Step S306), the selection unit 13 determines whether there is the hardware wireless processing unit 34-1, 34-2, . . . satisfying the condition indicated by the request information among the stopped hardware wireless processing unit 34-1, 34-2, . . . (Step S308).

In a case where the selection unit 13 determines that the hardware wireless processing unit satisfying the condition indicated by the request information is provided among the stopped hardware wireless processing units 34-1, 34-2, . . . (YES in Step S308), the selection unit 13 reads position information of the AP 30 including the hardware wireless processing unit 34-1, 34-2, or . . . satisfying the condition, from the "position information" item in the AP capacity information table 220. The selection unit 13 selects the AP 30 closest to an area indicated by the "service providing area" item in the request information, based on the read position information. The selection unit 13 selects any one hardware wireless processing unit 34-1, 34-2, or . . . satisfying the condition among the hardware wireless processing units 34-1, 34-2, . . . included in the selected AP 30, as a deployment target for the wireless communication service.

In the closest AP 30, in a case where there are a plurality of hardware wireless processing units 34-1, 34-2, . . . satisfying the conditions, the selection unit 13 selects any one of the plurality of hardware wireless processing units. In a case where there is one hardware wireless processing unit 34-1, 34-2, or . . . satisfying the condition in Step S306, the selection unit 13 does not need to select the closest AP 30 based on the position information, and the selection unit 13 selects the one hardware wireless processing unit 34-1, 34-2, or . . . as a deployment target for the wireless communication service.

The requesting unit 14 generates a request signal based on the condition indicated by the request information and the hardware wireless processing unit ID indicating the selected hardware wireless processing unit 34-1, 34-2, or . . . . The requesting unit 14 transmits the generated request signal to the AP 30 including the hardware wireless processing unit 34-1, 34-2, or . . . selected by the selection unit 13, through the transmission/reception unit 16. If the control unit 31 of the AP 30 receives the request signal through the transmission/reception unit 32, the control unit 31 outputs an activation instruction signal to the hardware wireless processing unit 34-1, 34-2, . . . corresponding to the hardware wireless processing unit ID included in the request signal, to activate the hardware wireless processing unit. After the activation, the control unit 31 performs deployment of the wireless communication service in accordance with the request information included in the request signal (Step S307). Then, the control unit 31 ends the subroutine of Policy A.

In a case where the selection unit 13 determines that there is no hardware wireless processing unit satisfying the condition indicated by the request information among the stopped hardware wireless processing units 34-1, 34-2, . . . (NO in Step S308), the selection unit 13 stores information indicating that deployment of the wireless communication service required by the request information is not possible by lack of resources, in the internal storage region. Then, the selection unit 13 ends the subroutine of Policy A (Step S310). The internal storage region in which the information indicating that deployment of the wireless communication service is not possible is stored is initialized by the selection unit 13, for example, in Step S101, when the selection unit 13 receives new request information output by the request information acquisition unit 12.

In a case where a new wireless communication service is started by performing deployment processing of the wireless communication service in accordance with Policy A illustrated in FIG. 10, resources are allocated in order from the hardware wireless processing unit 34-1, 34-2, . . . in use. Thus, it is possible to perform switching with high facility use efficiency. In a case where the AP 30 fails, the failure may affect a plurality of wireless communication services, and problems such as congestion, which occur in other wireless communication services may affect the wireless communication service using the same hardware wireless processing unit 34-1, 34-2, or . . . .

Deployment Processing of Wireless Communication Service in Accordance with Policy A Based on Request Information A specific example of deployment processing in accordance with Policy A based on request information illustrated in FIG. 9 will be described below. It is premised that the wireless communication service is not provided in any AP 30. In Step S101, if the operator of the service provider 1 performs an operation input, the request information acquisition unit 12 acquires the request information illustrated in FIG. 9 and outputs the request information to the selection unit 13. In Step S103, the AP use status information table 210 after the information collection unit 15 completes processing of collecting the AP use information and the AP capacity information is maintained to the initial state illustrated in FIG. 5. The information illustrated in FIG. 6 is written in the AP capacity information table 220.

Because the policy information table 230 is in the state illustrated in FIG. 7, the selection unit 13 starts processing of the subroutine of Policy A. In the process of Step S301, the selection unit 13 uses the AP use status information table 210 as the reference. Because the hardware wireless processing unit 34-1, 34-2, . . . is not shown in the AP use status information table 210, the selection unit 13 determines NO in Step S202, Step S304, and Step S306. In the process of Step S308, the selection unit 13 determines that a record in which the "AP-ID" item is "AP1" and the "hardware wireless processing unit ID" item is "AP1-RF2" satisfies a condition indicated by request information, and selects the record from the AP capacity information table 220. That is, the record satisfies the conditions indicated by the request information because the wireless standard is "802.11 g", "service providing area" includes "area A", and "data rate" is "1 Mbps". In addition, in a case where "number of service providing terminal apparatuses" required by the request information is 100, "guaranteed delay time" is 100 milliseconds, and 500 milliseconds of "allowable delay time" required by the request information is satisfied.

The selection unit 13 determines that a record in which the "AP-ID" item is "AP2" and the "hardware wireless processing unit ID" item is "AP1-RF2" also satisfies the condition indicated by the request information, and selects the record from the AP capacity information table 220. That is, the record also satisfies the conditions indicated by the request information because the wireless standard is "802.11 g", "service providing area" includes "area A", and "data rate" is "1 Mbps". In addition, in a case where "number of service providing terminal apparatuses" required by the request information is 100, "guaranteed delay time" is 200 milliseconds, and 500 milliseconds of "allowable delay time" required by the request information is satisfied.

Here, for convenience of description, the AP 30 of AP1 is set to an AP 30Aa, and the AP 30 of AP2 is set to an AP 30Ba. The hardware wireless processing unit 34-1, . . . of AP1-RF2 of AP1 is set to a hardware wireless processing unit 34Aa-2, and the hardware wireless processing unit 34-1, . . . of AP1-RF2 of AP2 is set to a hardware wireless processing unit 34Ba-2.

The selection unit 13 sets the determination result of the determination process in Step S308 to YES, and causes the process to proceed to Step S309. With reference to the "position information" item of the AP capacity information table 220, the selection unit 13 selects the record which is closest to "area A" being "service providing area" in the request information among the two records, that is, selects the hardware wireless processing unit 34Aa-2 of the AP 30Aa.

The requesting unit 14 generates a request signal for the hardware wireless processing unit 34Aa-2 of the AP 30Aa, which has been selected by the selection unit 13, and transmits the request signal through the transmission/reception unit 16. The request signal includes information addressed to the AP 30Aa and information for deploying the wireless communication service indicated by the request information to the hardware wireless processing unit 34Aa-2.

If a control unit 31Aa of the AP 30Aa receives the request signal through a transmission/reception unit 32Aa, the control unit 31Aa outputs an activation instruction signal to the stopped hardware wireless processing unit 34Aa-2. The hardware wireless processing unit 34Aa-2 receives the activation instruction signal and is activated. The control unit 31Aa outputs a start instruction signal to cause a software wireless processing unit 35Aa to read and execute program data in software in which the wireless standard is "802.11 g" from a storage unit 36Aa. The software wireless processing unit 35Aa receives the starting instruction signal to read the program data in software in which the wireless standard is "802.11 g" from the storage unit 36Aa and start to execute the program data. Thus, the software wireless processing unit sets "area A" as the service providing area and accommodates 100 radio terminal apparatuses 50.

The software wireless processing unit 35Aa executes the program data to demodulate a signal output by the hardware wireless processing unit 34Aa-2 in accordance with the 802.11 g wireless standard. The software wireless processing unit 35Aa modulates the signal output to the hardware wireless processing unit 34Aa-2 in accordance with the 802.11 g wireless standard. In this manner, the wireless communication service requested by the request information is started.

The selection unit 13 determines that deployment has been performed in Step S109 in FIG. 12. Then, the selection unit 13 writes the result of the deployment into the wireless service AP information table 200 of the wireless service assignment AP information database 20. FIG. 16 is a diagram illustrating the data configuration of the wireless service AP information table 200 after the selection unit 13 has written the result of the deployment. After the deployment processing of the wireless communication service, as illustrated in FIG. 16, information for each service after the deployment processing is registered in the wireless service AP information table 200.

FIG. 17 is a diagram illustrating a specific example of the AP use status information table 210 after the deployment processing of the wireless communication service. After the deployment processing of the wireless communication service, as illustrated in FIG. 17, information indicating the use status of each AP 30 after the deployment processing is registered in the AP use status information table 210.

Figure 19:
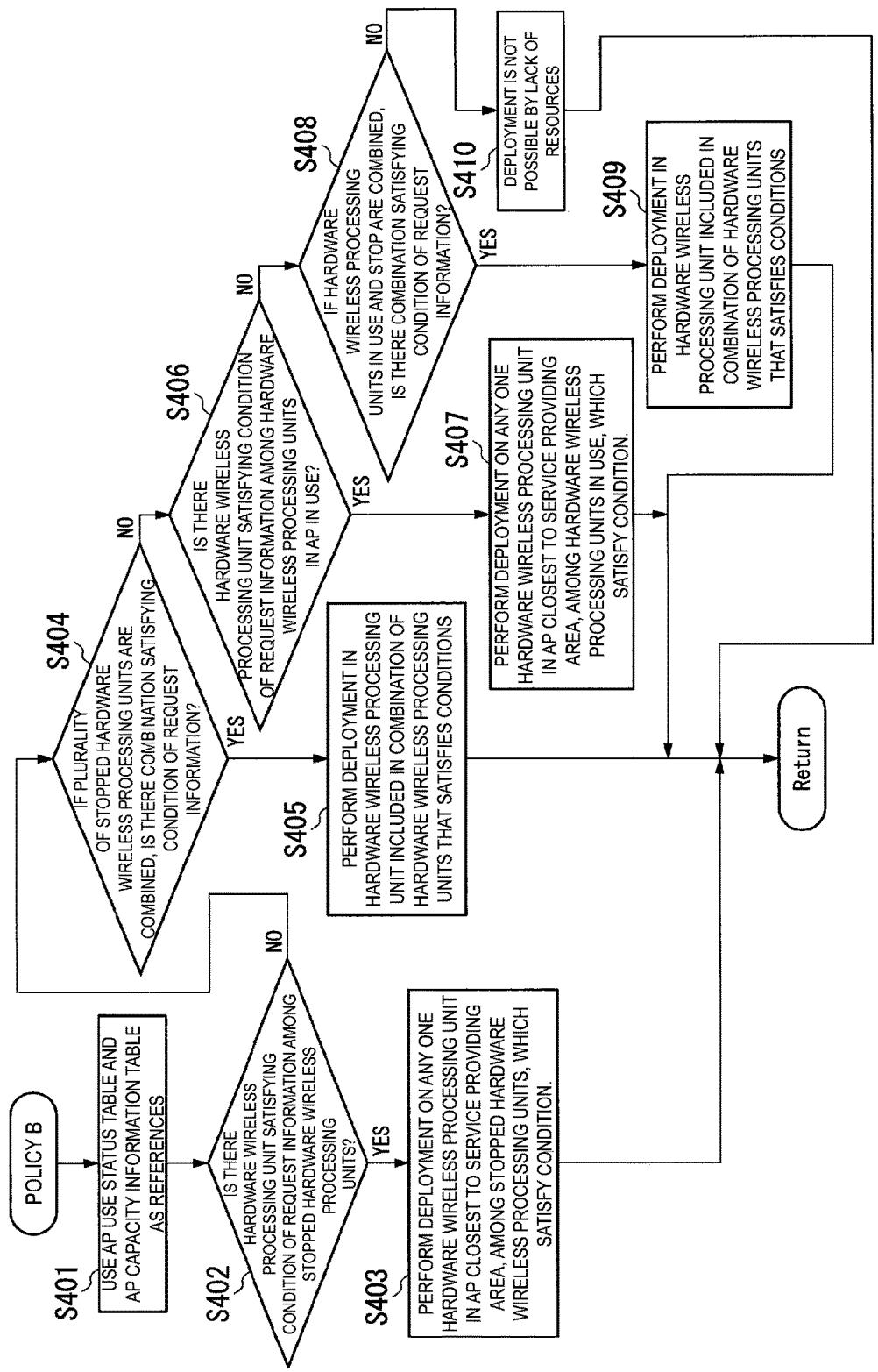
FIG. 19 is a flowchart illustrating the deployment processing of the wireless communication service by Policy B in the first embodiment.

Next, the deployment processing of the wireless communication service based on Policy B will be described with reference to FIG. 18 and FIG. 19.

Before the processing illustrated in FIG. 12 is started, the policy information acquisition unit 11 in the AP management apparatus 10 acquires a policy ID by receiving an operation input of a wireless infrastructure provider. Here, it is assumed that the wireless infrastructure provider has input Policy B by an operation. If the policy information acquisition unit acquires an ID of Policy B, the policy information acquisition unit 11 rewrites information in the "selection flag" item in a record of the policy information table 230 in the policy information database 23, in which "policy ID" is "Policy B", to "selected", and rewrites information in the "selection flag" item in other records to "not selected". Thus, the policy information table 230 is in a state illustrated in FIG. 18.

If the selection unit 13 receives request information output by the request information acquisition unit 12, the selection unit 13 reads the "policy ID" item in a record in which "selection flag" is "selected", with reference to the policy information table 230 in the policy information database 23. In Step S108, the selection unit 13 calls a subroutine of an algorithm of a selection procedure corresponding to the read policy ID and starts processing of the called subroutine. Here, because the policy information table 230 is in the state illustrated in FIG. 18, the selection unit 13 performs the subroutine of an algorithm for the selection procedure of Policy B. FIG. 19 is a flowchart illustrating the deployment processing of the wireless communication service based on Policy B. The processing in FIG. 19 is performed in ascending order of the processing order stored in the scheduling buffer.

After the information collection unit 15 completes collection of the AP use status information and the AP capacity information, the selection unit 13 refers to information stored in the AP use status information table 210 of the AP use status information database 21 and information stored in the AP capacity information table 220 of the AP capacity information database 22 (Step S401). The selection unit 13 detects the stopped hardware wireless processing unit 34-1, 34-2, . . . , based on the information stored in the AP use status information table 210 and the information stored in the AP capacity information table 220. The selection unit 13 determines whether there is the hardware wireless processing unit 34-1, 34-2, . . . satisfying a condition indicated by request information among the hardware wireless processing units 34-1, 34-2, . . . , based on the information stored in the AP capacity information table 220 (Step S402).

In a case where the selection unit 13 determines that the hardware wireless processing unit satisfying the condition indicated by the request information is provided among the detected hardware wireless processing units 34-1, 34-2, . . . in stop (YES in Step S402), the selection unit 13 reads position information of the AP 30 including the hardware wireless processing unit 34-1, 34-2, or . . . satisfying the condition, from the "position information" item in the AP capacity information table 220. The selection unit 13 selects the AP 30 closest to an area indicated by the "service providing area" item in the request information, based on the read position information. The selection unit 13 selects any one hardware wireless processing unit 34-1, 34-2, or . . . satisfying the condition among the hardware wireless processing units 34-1, 34-2, . . . included in the selected AP 30, as a deployment target for the wireless communication service.

In the closest AP 30, in a case where there are a plurality of hardware wireless processing units 34-1, 34-2, . . . satisfying the conditions, the selection unit 13 selects any one of the plurality of hardware wireless processing units. In a case where there is one hardware wireless processing unit 34-1, 34-2, or . . . satisfying the condition in Step S402, the selection unit 13 does not need to select the closest AP 30 based on the position information, and the selection unit 13 selects the one hardware wireless processing unit 34-1, 34-2, or . . . as a deployment target for the wireless communication service.

The requesting unit 14 generates a request signal based on the condition indicated by the request information and the hardware wireless processing unit ID indicating the selected hardware wireless processing unit 34-1, 34-2, or . . . . The requesting unit 14 transmits the generated request signal to the AP 30 including the hardware wireless processing unit 34-1, 34-2, or . . . selected by the selection unit 13, through the transmission/reception unit 16. If the control unit 31 of the AP 30 receives the request signal through the transmission/reception unit 32, the control unit 31 outputs an activation instruction signal to the hardware wireless processing unit 34-1, 34-2, . . . corresponding to the hardware wireless processing unit ID included in the request signal, to activate the hardware wireless processing unit. After the activation, the control unit 31 performs deployment of the wireless communication service in accordance with the request information included in the request signal (Step S403). Then, the control unit 31 ends the subroutine of Policy B.

In a case where the selection unit 13 determines that there is no hardware wireless processing unit satisfying the condition indicated by the request information among the detected hardware wireless processing units 34-1, 34-2, . . . in stop (NO in Step S402), the selection unit 13 combines the stopped hardware wireless processing units 34-1, 34-2, . . . and determines whether there is a combination satisfying the condition indicated by the request information (Step S404). When the selection unit 13 generates the combination, the selection unit 13 sequentially selects the hardware wireless processing units 34-1, 34-2, . . . provided in the AP 30 close to the area indicated in the "service providing area" item of the request information to generate a combination. The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13 determines that there is a combination of the stopped hardware wireless processing unit 34-1, 34-2, . . . , which satisfies the condition indicated by the request information (YES in Step S404), the selection unit 13 selects all of the hardware wireless processing unit 34-1, 34-2, . . . included in the combination, as a deployment target for the wireless communication service. The requesting unit 14 generates a request signal for each of hardware wireless processing units 34-1, 34-2, . . . included in the combination selected by the selection unit 13. Allocation of resources for each hardware wireless processing unit 34-1, 34-2, . . . is required when the selection unit 13 generates the combination. Thus, the requesting unit 14 generates the request signal in accordance with the allocation of the resources, which is required by the selection unit 13.

The requesting unit 14 transmits the generated request signal for each hardware wireless processing unit 34-1, 34-2, . . . to the AP 30 including the hardware wireless processing units 34-1, 34-2, . . . included in the combination, through the transmission/reception unit 16. If the control unit 31 of each AP 30 receives the request signal through the transmission/reception unit 32, the control unit 31 outputs an activation instruction signal to the hardware wireless processing unit 34-1, 34-2, . . . corresponding to the hardware wireless processing unit ID included in the request signal, to activate the hardware wireless processing unit. After the activation, the control unit 31 performs deployment of the wireless communication service in accordance with the request information included in the request signal (Step S405). Then, the control unit 31 ends the subroutine of Policy B.

In a case where the selection unit 13 determines that there is no combination of the stopped hardware wireless processing unit 34-1, 34-2, . . . , which satisfies the condition indicated by the request information (NO in Step S404), the selection unit 13 detects the hardware wireless processing unit 34-1, 34-2, . . . in use, based on the information stored in the AP use status information table 210. The selection unit 13 determines whether there is the hardware wireless processing unit 34-1, 34-2, . . . satisfying the condition indicated by the request information among the detected hardware wireless processing units 34-1, 34-2, . . . in use (Step S406).

In a case where the selection unit 13 determines that the hardware wireless processing unit satisfying the condition indicated by the request information is provided among the detected hardware wireless processing units 34-1, 34-2, . . . in use (YES in Step S406), the selection unit 13 reads position information of the AP 30 including the hardware wireless processing unit 34-1, 34-2, or . . . satisfying the condition, from the "position information" item in the AP capacity information table 220. The selection unit 13 selects the AP 30 closest to an area indicated by the "service providing area" item in the request information, based on the read position information. The selection unit 13 selects any one hardware wireless processing unit 34-1, 34-2, or . . . satisfying the condition among the hardware wireless processing units 34-1, 34-2, . . . included in the selected AP 30, as a deployment target for the wireless communication service.

In the closest AP 30, in a case where there are a plurality of hardware wireless processing units 34-1, 34-2, . . . satisfying the conditions, the selection unit 13 selects any one of the plurality of hardware wireless processing units. In a case where there is one hardware wireless processing unit 34-1, 34-2, or . . . satisfying the condition in Step S406, the selection unit 13 does not need to select the closest AP 30 based on the position information, and the selection unit 13 selects the one hardware wireless processing unit 34-1, 34-2, or . . . as a deployment target for the wireless communication service.

The requesting unit 14 generates a request signal based on the request information and the hardware wireless processing unit ID indicating the selected hardware wireless processing unit 34-1, 34-2, or . . . . The requesting unit 14 transmits the generated request signal to the AP 30 including the hardware wireless processing unit 34-1, 34-2, or . . . selected by the selection unit 13, through the transmission/reception unit 16. If the control unit 31 in the AP 30 receives the request signal through the transmission/reception unit 32, the control unit 31 performs deployment of the wireless communication service on the hardware wireless processing unit 34-1, 34-2, . . . corresponding to the hardware wireless processing unit ID included in the request signal, in accordance with request information included in the request signal (Step S407). Then, the control unit 31 ends the subroutine of Policy B.

In a case where the selection unit 13 determines that there is no hardware wireless processing unit satisfying the condition indicated by the request information among the detected hardware wireless processing units 34-1, 34-2, . . . in use (NO in Step S406), the selection unit 13 combines the hardware wireless processing units 34-1, 34-2, . . . in use and stop, and determines whether there is a combination satisfying the condition indicated by the request information (Step S408). When the selection unit 13 generates the combination, the selection unit 13 sequentially selects the hardware wireless processing units 34-1, 34-2, . . . provided in the AP 30 close to the area indicated in the "service providing area" item of the request information to generate a combination.

The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13 determines that there is a combination of the hardware wireless processing unit 34-1, 34-2, . . . in use and stop, which satisfies the condition indicated by the request information (YES in Step S408), the selection unit 13 selects all of the hardware wireless processing unit 34-1, 34-2, . . . included in the combination, as a deployment target for the wireless communication service. The requesting unit 14 generates a request signal for each of hardware wireless processing units 34-1, 34-2, . . . included in the combination selected by the selection unit 13. Allocation of resources for each hardware wireless processing unit 34-1, 34-2, . . . is required when the selection unit 13 generates the combination. Thus, the requesting unit 14 generates the request signal in accordance with the allocation of the resources, which is required by the selection unit 13.

The requesting unit 14 transmits the generated switching request signal for each hardware wireless processing unit 34-1, 34-2, . . . to the AP 30 including the hardware wireless processing units 34-1, 34-2, . . . included in the combination, through the transmission/reception unit 16. If the control unit 31 in each AP 30 receives the request signal through the transmission/reception unit 32, the control unit 31 performs deployment of the wireless communication service on the hardware wireless processing unit 34-1, 34-2, . . . corresponding to the hardware wireless processing unit ID included in the request signal, in accordance with request information included in the request signal. The control unit 31 outputs an activation instruction signal to the stopped hardware wireless processing unit 34-1, 34-2, . . . to activate the stopped hardware wireless processing unit 34-1, 34-2, . . . . After the activation, the control unit 31 performs deployment of the wireless communication service in accordance with the request information included in the request signal (Step S409). Then, the control unit 31 ends the subroutine of Policy B.

In a case where the selection unit 13 determines that there is no combination of the hardware wireless processing unit 34-1, 34-2, . . . in use and stop, which satisfies the condition indicated by the request information (NO in Step S408), the selection unit 13 stores information indicating that deployment of the wireless communication service required by the request information is not possible by lack of resources, in the internal storage region. Then, the selection unit 13 ends the subroutine of Policy B (Step S410).

In a case where a new wireless communication service is started by performing deployment processing of the wireless communication service in accordance with Policy B illustrated in FIG. 18, resources are allocated in order from the stopped hardware wireless processing unit 34-1, 34-2, .... Thus, available resources are easily generated in the hardware wireless processing unit 34-1, 34-2, ... in use, and thus the facility use efficiency is reduced in comparison to Policy A. With the deployment processing in accordance with Policy B, each wireless communication service is often deployed to the hardware wireless processing units 34-1, 34-2, which are different from each other. Thus, an occurrence of a situation in which a problem in a certain wireless communication service, for example, a problem such as failure and congestion, which occurs in the wireless communication service, affects other wireless communication services is reduced.

With the configuration in the first embodiment described above, the AP management apparatus 10 stores the request information in the scheduling buffer, and sorts the request information stored in the scheduling buffer in accordance with the priority of the providing area. The AP management apparatus 10 assigns the AP 30 from the request information having a high processing order among pieces of request information after sorting. Thus, it is possible to preferentially assign the AP 30 from the request information in which the providing area is narrow. Thus, it is possible to optimally assign the AP in response to a plurality of service requests. As a result, it is possible to improve use efficiency of the AP 30.

Second Embodiment

Figure 20:
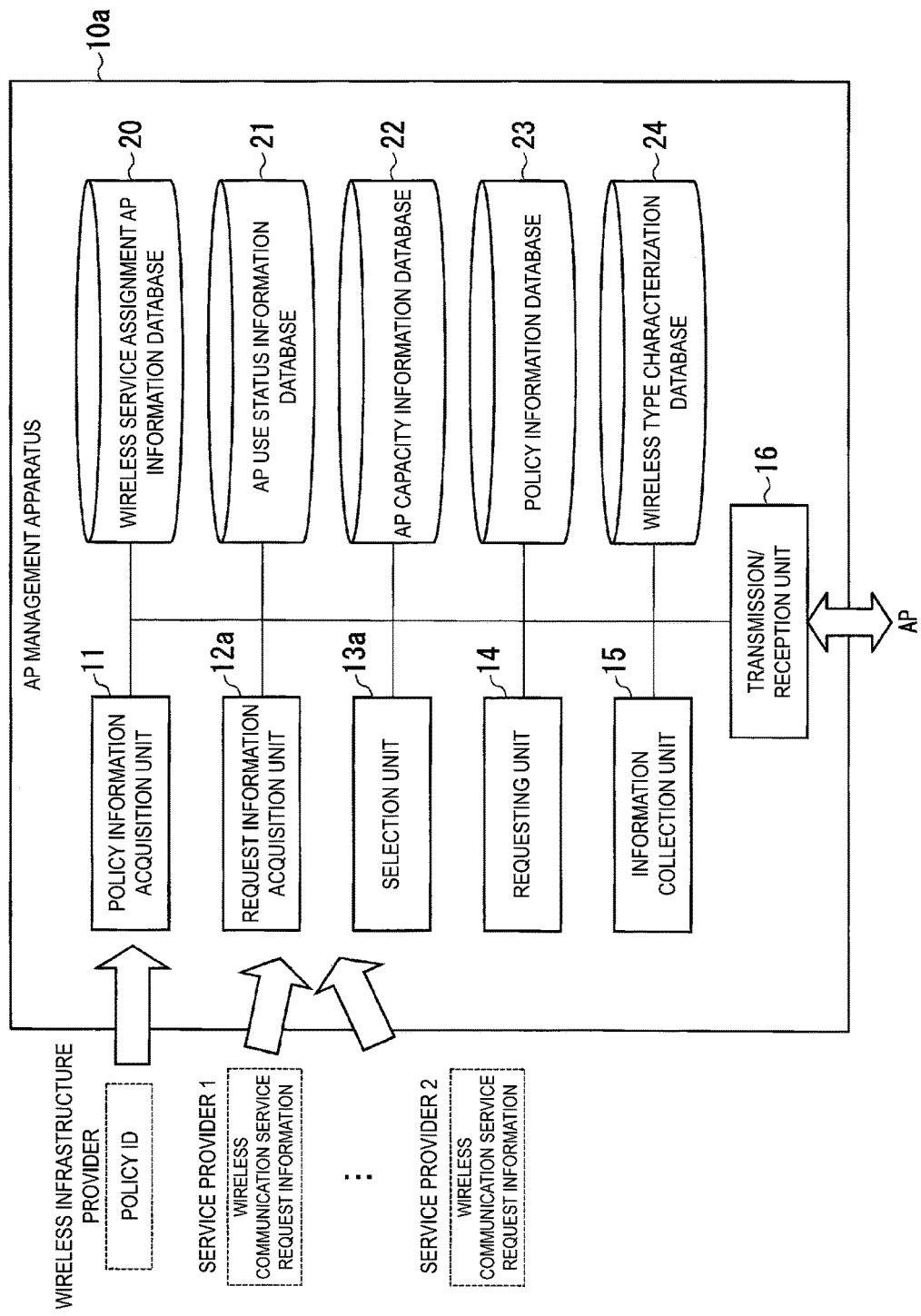
FIG. 20 is a block diagram illustrating an internal configuration and the like of an AP management apparatus according to a second embodiment of the present disclosure.

FIG. 20 is a block diagram illustrating an internal configuration of an AP management apparatus 10a according to a second embodiment of the present disclosure and a relationship of information transmitted and received to and from the outside by the AP management apparatus 10a. In the AP management apparatus 10a, the same components as those in the first embodiment are denoted by the same reference signs. Different components will be described below. The AP management apparatus 10a includes a policy information acquisition unit 11, a request information acquisition unit 12a, a selection unit 13a, a requesting unit 14, an information collection unit 15, a transmission/reception unit 16, a wireless service assignment AP information database 20, an AP use status information database 21, an AP capacity information database 22, a policy information database 23, and a wireless standard characteristic database 24.

The request information acquisition unit 12a receives an operation input by an operator of each of a plurality of service providers that provide wireless communication services, and acquires request information for the wireless communication service requested by the service provider. In the second embodiment, for example, as illustrated in FIG. 21, request information includes items of "service provider ID," "service providing area," "number of service providing terminals", "data rate", "allowable delay time", "service start date and time", "service end date and time", and "communication interval". The request information in the second embodiment is different from the request information in the first embodiment in that the "wireless standard" item is not included.

The request information acquisition unit 12a outputs the acquired request information to the selection unit 13a.

Similar to the request information acquisition unit 12 in the first embodiment, the request information acquisition unit 12a may be connected to operation devices of a plurality of service providers via a communication line. In this manner, the operator of each service provider may operate the operation device to transmit the request information, and the request information acquisition unit 12a may receive and acquire the request information via the communication line. Thus, the operator of each service provider can remotely request the deployment of the wireless communication service.

The selection unit 13a selects the hardware wireless processing unit 34-1, 34-2, or ... of the AP 30, which satisfies a condition indicated by the request information, based on the request information output by the request information acquisition unit 12a, information stored in an AP use status information table 210 of the AP use status information database 21, information stored in an AP capacity information table 220 of the AP capacity information database 22, information stored in a policy information table 230 of the policy information database 23, and a wireless standard characteristic table 240. Scheduling buffer sorting processing and deployment processing in accordance with a policy in the selection unit 13a are different from the processing performed by the selection unit 13 in the first embodiment.

Similar to the selection unit 13 in the first embodiment, when the selection unit 13a selects the hardware wireless processing unit 34-1, 34-2, or ... in the AP 30, which satisfies the conditions indicated by the request information, the selection unit 13 stores the request information in a scheduling buffer corresponding to the start date, or the date and time of the wireless communication service, which is included in the request information.

FIG. 22 is a diagram illustrating the data configuration of the scheduling buffer in the second embodiment.

Request information in which a start date of a wireless communication service is on Apr. 1, 2018 is stored in the scheduling buffer illustrated in FIG. 22. The difference from the data configuration of the scheduling buffer illustrated in FIG. 10 is that the scheduling buffer illustrated in FIG. 22 does not include the wireless standard. Other components are identical to those in the data configuration of the scheduling buffer illustrated in FIG. 10. Although the description is omitted here, the selection unit 13a includes a scheduling buffer for each predetermined period, for example, every day, similar to the selection unit 13 in the first embodiment.

Figure 23:
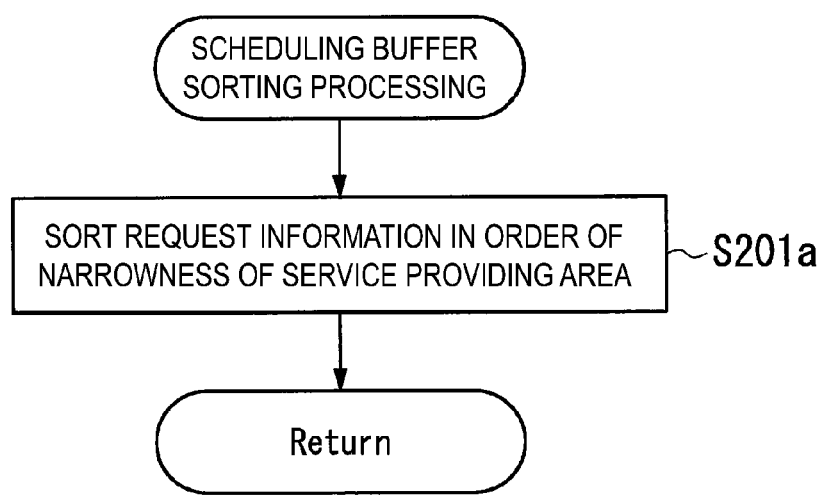
FIG. 23 is a flowchart illustrating scheduling buffer sorting processing in the second embodiment.

FIG. 23 is a flowchart illustrating scheduling buffer sorting processing in the second embodiment.

Firstly, the selection unit 13a sorts each piece of request information stored in the scheduling buffer (for example, request information illustrated in FIG. 21) in order of the narrow service providing area (Step S201a). Processing of performing sorting in order that the service providing area is narrow is similar to Step S201 in FIG. 13, and thus repetitive description will be omitted.

After the process in Step S201a, the selection unit 13a assigns information indicating the processing order, for example, "1" to each piece of request information, as illustrated in FIG. 24. FIG. 24 is a diagram illustrating a specific example of the scheduling buffer after sorting processing in the second embodiment. As illustrated in FIG. 24, the processing order is illustrated as follows. The processing orders of two pieces of request information being the request information to which the service ID of "3" is assigned and the request information to which the service ID of "4" is assigned are "1". The processing order of the request information to which the service ID of "2" is assigned is "2", and the processing order of the request information to which the service ID of "1" is assigned is "3".

Figure 25:
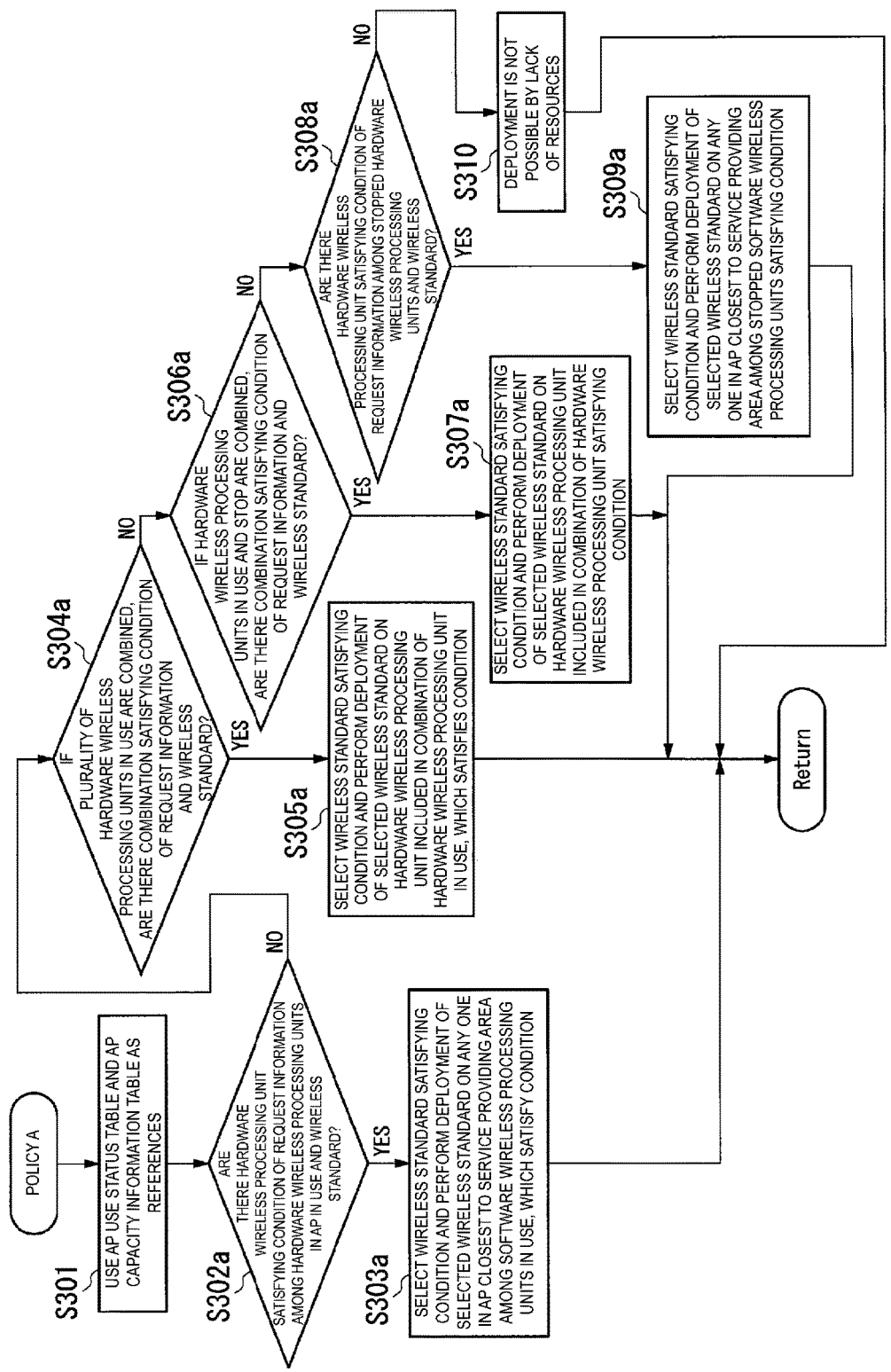
FIG. 25 is a flowchart illustrating deployment processing of the wireless communication service by Policy A in the second embodiment.

Next, the deployment processing of the wireless communication service based on Policy A in the second embodiment will be described with reference to FIG. 25. FIG. 25 is a flowchart illustrating the deployment processing of the wireless communication service based on Policy A in the second embodiment. The processing in FIG. 25 is performed in ascending order of the processing order stored in the scheduling buffer is high. In FIG. 25, processes similar to those illustrated in FIG. 15 are denoted by the same reference signs as in FIG. 15, and repetitive description will be omitted.

After the process of Step S301, the selection unit 13a detects the hardware wireless processing unit 34-1, 34-2, or . . . in use, based on the information stored in the AP use status information table 210. The selection unit 13 determines whether the hardware wireless processing unit 34-1, 34-2, or . . . satisfying the conditions indicated by the request information, that is, conditions indicated by the items of "service providing area", "number of service providing terminal apparatuses", "data rate", and "allowable delay time" is provided among the detected hardware wireless processing units 34-1, 34-2, . . . in use. The selection unit 13 determines whether there is a wireless standard satisfying "number of service providing terminal apparatuses", "data rate", and "allowable delay time" in the conditions indicated by the request information. The selection unit 13 performs determination based on the information stored in the AP capacity information table 220 (Step S302a).

In a case where the selection unit 13a determines that the hardware wireless processing unit satisfying the condition indicated by the request information is provided among the detected hardware wireless processing units 34-1, 34-2, . . . in use, and there is a wireless standard satisfying "number of service providing terminal apparatuses", "data rate", and "allowable delay time" in the conditions indicated by the request information (YES in S302a), the selection unit 13a reads position information of the AP 30 including the wireless processing unit 34-1, 34-2, . . . satisfying the condition, from the "position information" item in the AP capacity information table 220. The selection unit 13a selects the AP 30 closest to an area indicated by the "service providing area" item in the request information, based on the read position information. For example, a center point of an area, or a reference point which has been predetermined for each area is applied as the reference point of the area when a distance is calculated. The selection unit 13a selects any one hardware wireless processing unit 34-1, 34-2, or . . . satisfying the condition among the hardware wireless processing units 34-1, 34-2, . . . included in the selected AP 30, as a deployment target for the wireless communication service.

In the closest AP 30, in a case where there are a plurality of hardware wireless processing units 34-1, 34-2, . . . satisfying the conditions, the selection unit 13a randomly selects any one of the plurality of hardware wireless processing units. In a case where there is one hardware wireless processing unit 34-1, 34-2, or . . . satisfying the condition in Step S302a, the selection unit 13a does not need to select the closest AP 30 based on the position information, and the selection unit 13a selects the one hardware wireless processing unit 34-1, 34-2, or . . . as a deployment target for the wireless communication service. The selection unit 13a selects a wireless standard satisfying "number of service providing terminal apparatuses", "data rate", and "allowable delay time" in the conditions indicated by the request information, to be the wireless standard for deployment.

The requesting unit 14 generates a request signal based on the request information and information indicating the hardware wireless processing unit ID indicating the selected hardware wireless processing unit 34-1, 34-2, or . . . , and the wireless standard selected by the selection unit 13a. The requesting unit 14 transmits the generated request signal to the AP 30 including the hardware wireless processing unit 34-1, 34-2, or . . . selected by the selection unit 13a, through the transmission/reception unit 16. If the control unit 31 in the AP 30 receives the request signal through the transmission/reception unit 32, the control unit 31 performs deployment of the wireless communication service (for example, including deployment of the wireless standard) on the hardware wireless processing unit 34-1, 34-2, . . . corresponding to the hardware wireless processing unit ID included in the request signal, in accordance with the request signal (Step S303a). Then, the control unit 31 ends the subroutine of Policy A.

In a case where the selection unit 13a determines that there is either or neither of the hardware wireless processing unit satisfying the conditions indicated by the request information among the detected hardware wireless processing unit 34-1, 34-2, . . . in use and the wireless standard satisfying "number of service providing terminal apparatuses", "data rate", and "allowable delay time" in the conditions indicated by the request information (NO in Step S302a), the selection unit 13a combines the hardware wireless processing unit 34-1, 34-2, . . . in use and determines whether the combination satisfying the condition indicated by the request information and the wireless standard satisfying "number of service providing terminal apparatuses", "data rate", and "allowable delay time" in the conditions indicated by the request information are provided (Step S304a).

When the selection unit 13a generates the combination, the selection unit 13 sequentially selects the hardware wireless processing units 34-1, 34-2, . . . in use, which are provided in the AP 30 close to the area indicated in the "service providing area" item of the request information to generate a combination. The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13a determines that the combination of the hardware wireless processing unit 34-1, 34-2, . . . in use, which satisfies the condition indicated by the request information and the wireless standard satisfying "number of service providing terminal apparatuses", "data rate", and "allowable delay time" in the conditions indicated by the request information are provided (YES in Step S304a), the selection unit 13a selects all the hardware wireless processing units 34-1, 34-2, . . . included in the combination, as deployment targets of the wireless communication service. The selection unit 13a selects a wireless standard satisfying "number of service providing terminal apparatuses", "data rate", and "allowable delay time" in the conditions indicated by the request information, to be the wireless standard for deployment. The requesting unit 14 generates a request signal for each of hardware wireless processing units 34-1, 34-2, . . . included in the combination selected by the selection unit 13a. At this time, the request signal includes information indicating the wireless standard selected by the selection unit 13a. Allocation of resources for each hardware wireless processing unit 34-1, 34-2, . . .

is required when the selection unit 13 generates the combination. Thus, the requesting unit 14 generates the request signal in accordance with the allocation of the resources, which is required by the selection unit 13.

The requesting unit 14 transmits the generated request signal for each hardware wireless processing unit 34-1, 34-2, . . . to the AP 30 including the hardware wireless processing units 34-1, 34-2, . . . included in the combination, through the transmission/reception unit 16. If the control unit 31 in each AP 30 receives the request signal through the transmission/reception unit 32, the control unit 31 performs deployment of the wireless communication service (for example, including deployment of the wireless standard) on the hardware wireless processing unit 34-1, 34-2, . . . corresponding to the hardware wireless processing unit ID included in the request signal, in accordance with the request information included in the request signal (Step S305*a*). Then, the control unit 31 ends the subroutine of Policy A.

In a case where the selection unit 13*a* determines that there is either or neither of the combination of the hardware wireless processing unit 34-1, 34-2, . . . in use, which satisfies the condition indicated by the request information and the wireless standard satisfying "number of service providing terminal apparatuses", "data rate", and "allowable delay time" in the conditions indicated by the request information (NO in Step S304*a*), the selection unit 13*a* detects the stopped hardware wireless processing unit 34-1, 34-2, . . . based on the information stored in the AP use status information table 210 and the information stored in the AP capacity information table 220. The selection unit 13*a* combines the hardware wireless processing unit 34-1, 34-2, . . . in use and stop and determines whether the combination satisfying the condition indicated by the request information and the wireless standard satisfying "number of service providing terminal apparatuses", "data rate", and "allowable delay time" in the conditions indicated by the request information are provided (Step S306*a*).

When the selection unit 13*a* generates the combination, the selection unit 13 preferentially generates a combination of the hardware wireless processing unit 34-1, 34-2, . . . in use such that a combination of only the stopped hardware wireless processing unit 34-1, 34-2, . . . is not generated. When the selection unit 13*a* generates the combination, the selection unit 13 sequentially selects the hardware wireless processing units 34-1, 34-2, . . . provided in the AP 30 close to the area indicated in the "service providing area" item of the request information to generate a combination. The combination of the hardware wireless processing unit 34-1, 34-2, . . . may be obtained by combining a plurality of hardware wireless processing units 34-1, 34-2, . . . from the same AP 30, or combining hardware wireless processing units 34-1, 34-2, . . . of different APs 30.

In a case where the selection unit 13*a* determines that the combination of the hardware wireless processing unit 34-1, 34-2, . . . in use and stop, which satisfies the condition indicated by the request information and the wireless standard satisfying "number of service providing terminal apparatuses", "data rate", and "allowable delay time" in the conditions indicated by the request information are provided (YES in Step S306*a*), the selection unit 13*a* selects all the hardware wireless processing units 34-1, 34-2, . . . included in the combination, as deployment targets of the wireless communication service. The selection unit 13*a* selects a wireless standard satisfying "number of service providing terminal apparatuses", "data rate", and "allowable delay time" in the conditions indicated by the request information, to be the wireless standard for deployment. The requesting unit 14 generates a request signal for each of hardware wireless processing units 34-1, 34-2, . . . included in the combination selected by the selection unit 13*a*. At this time, the request signal includes information indicating the wireless standard selected by the selection unit 13*a*. Allocation of resources for each hardware wireless processing unit 34-1, 34-2, . . . is required when the selection unit 13*a* generates the combination. Thus, the requesting unit 14 generates the request signal in accordance with the allocation of the resources, which is required by the selection unit 13*a*.

The requesting unit 14 transmits the generated request signal for each hardware wireless processing unit 34-1, 34-2, . . . to the AP 30 including the hardware wireless processing units 34-1, 34-2, . . . included in the combination, through the transmission/reception unit 16. If the control unit 31 in each AP 30 receives the request signal through the transmission/reception unit 32, the control unit 31 performs deployment of the wireless communication service (for example, including deployment of the wireless standard) on the hardware wireless processing unit 34-1, 34-2, . . . corresponding to the hardware wireless processing unit ID included in the request signal, in accordance with request information included in the request signal. The control unit 31 outputs an activation instruction signal to the stopped hardware wireless processing unit 34-1, 34-2, . . . to activate the stopped hardware wireless processing unit 34-1, 34-2, . . . . After the activation, the control unit 31 performs deployment of the wireless communication service (for example, including deployment of the wireless standard) in accordance with the request information included in the request signal (Step S307*a*). Then, the control unit 31 ends the subroutine of Policy A.

In a case where the selection unit 13*a* determines that there is either or neither of the combination of the hardware wireless processing unit 34-1, 34-2, . . . in use and stop, which satisfies the condition indicated by the request information and the wireless standard satisfying "number of service providing terminal apparatuses", "data rate", and "allowable delay time" in the conditions indicated by the request information (NO in Step S306*a*), the selection unit 13*a* determines whether the hardware wireless processing unit 34-1, 34-2, . . . satisfying the condition indicated by the request information among the stopped hardware wireless processing units 34-1, 34-2, . . . and the wireless standard satisfying "number of service providing terminal apparatuses", "data rate", and "allowable delay time" in the conditions indicated by the request information are provided (Step S308*a*).

In a case where the selection unit 13*a* determines that the hardware wireless processing unit satisfying the condition indicated by the request information is provided among the stopped hardware wireless processing units 34-1, 34-2, . . . , and there is the wireless standard satisfying "number of service providing terminal apparatuses", "data rate", and "allowable delay time" in the conditions indicated by the request information (YES in S308*a*), the selection unit 13*a* reads position information of the AP 30 including the wireless processing unit 34-1, 34-2, . . . satisfying the condition, from the "position information" item in the AP capacity information table 220. The selection unit 13*a* selects the AP 30 closest to an area indicated by the "service providing area" item in the request information, based on the read position information. The selection unit 13*a* selects any one hardware wireless processing unit 34-1, 34-2, or . . . satisfying the condition among the hardware wireless processing units 34-1, 34-2, . . . included in the selected AP 30, as a deployment target for the wireless communication service. The selection unit 13a selects a wireless standard satisfying "number of service providing terminal apparatuses", "data rate", and "allowable delay time" in the conditions indicated by the request information, to be the wireless standard for deployment.

In the closest AP 30, in a case where there are a plurality of hardware wireless processing units 34-1, 34-2, . . . satisfying the conditions, the selection unit 13a selects any one of the plurality of hardware wireless processing units. In a case where there is one hardware wireless processing unit 34-1, 34-2, or . . . satisfying the condition in Step S306a, the selection unit 13a does not need to select the closest AP 30 based on the position information, and the selection unit 13a selects the one hardware wireless processing unit 34-1, 34-2, or . . . as a deployment target for the wireless communication service.

The requesting unit 14 generates a request signal based on the condition indicated by the request information and information indicating the hardware wireless processing unit ID indicating the selected hardware wireless processing unit 34-1, 34-2, or . . . , and the wireless standard selected by the selection unit 13a. The requesting unit 14 transmits the generated request signal to the AP 30 including the hardware wireless processing unit 34-1, 34-2, or . . . selected by the selection unit 13a, through the transmission/reception unit 16. If the control unit 31 of the AP 30 receives the request signal through the transmission/reception unit 32, the control unit 31 outputs an activation instruction signal to the hardware wireless processing unit 34-1, 34-2, . . . corresponding to the hardware wireless processing unit ID included in the request signal, to activate the hardware wireless processing unit. After the activation, the control unit 31 performs deployment of the wireless communication service (for example, including deployment of the wireless standard) in accordance with the request information included in the request signal (Step S309a). Then, the control unit 31 ends the subroutine of Policy A.

In a case where the selection unit 13a determines that there is no hardware wireless processing unit satisfying the condition indicated by the request information among the stopped hardware wireless processing units 34-1, 34-2, . . . (NO in Step S308a), the selection unit 13a stores information indicating that deployment of the wireless communication service required by the request information is not possible by lack of resources, in the internal storage region. Then, the selection unit 13a ends the subroutine of Policy A (Step S310). The internal storage region in which the information indicating that deployment of the wireless communication service is not possible is stored is initialized by the selection unit 13, for example, in Step S101, when the selection unit 13a receives new request information output by the request information acquisition unit 12.

With the configuration in the second embodiment described above, in the AP management apparatus 10a, the request information acquisition unit 12a acquires the request information. Because the wireless standard is not designated in the request information, when the selection unit 13 selects the AP 30 satisfying the condition indicated by the request information based on the AP capacity information and the AP use status information, the selection unit 13 can select, for example, the AP 30 that provides the wireless communication service with higher communication quality, from more candidates. Thus, it is possible to dynamically and appropriately provide services of multiple types of wireless standards in response to a request and to facilitate the management.

Third Embodiment

Figure 26:
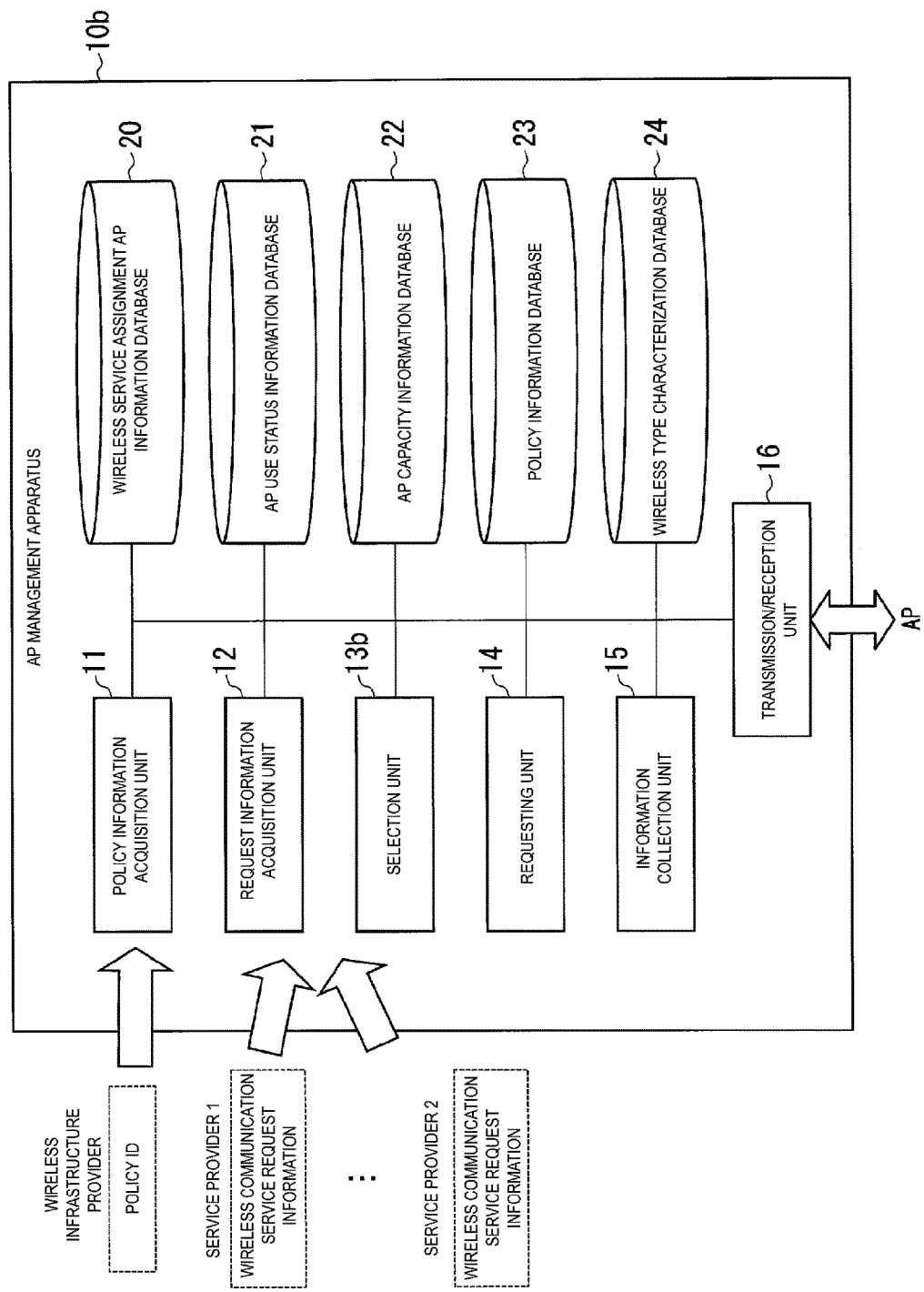
FIG. 26 is a block diagram illustrating an internal configuration and the like of an AP management apparatus according to a third embodiment of the present disclosure.

FIG. 26 is a block diagram illustrating an internal configuration of an AP management apparatus 10b according to a third embodiment of the present disclosure and a relationship of information transmitted and received to and from the outside by the AP management apparatus 10b. In the AP management apparatus 10b, the same components as those in the first embodiment are denoted by the same reference signs. Different components will be described below. The AP management apparatus 10b includes a policy information acquisition unit 11, a request information acquisition unit 12, a selection unit 13b, a requesting unit 14, an information collection unit 15, a transmission/reception unit 16, a wireless service assignment AP information database 20, an AP use status information database 21, an AP capacity information database 22, a policy information database 23, and a wireless standard characteristic database 24.

A configuration of the selection unit 13b which is different from the selection unit 13 in the first embodiment is that request information is grouped before sorting in scheduling buffer sorting processing. In a case where the wireless standards which are stored in a scheduling buffer and are used between different pieces of request information are identical to each other, and a request condition is satisfied, the selection unit 13b groups the pieces of request information. In a case where the wireless standards which are stored in a scheduling buffer and are used between different pieces of request information are different from each other, the communication interval of the wireless standard is intermittent, and communication timings are shifted from each other, the selection unit 13b groups the pieces of request information to the same group.

Figure 27:
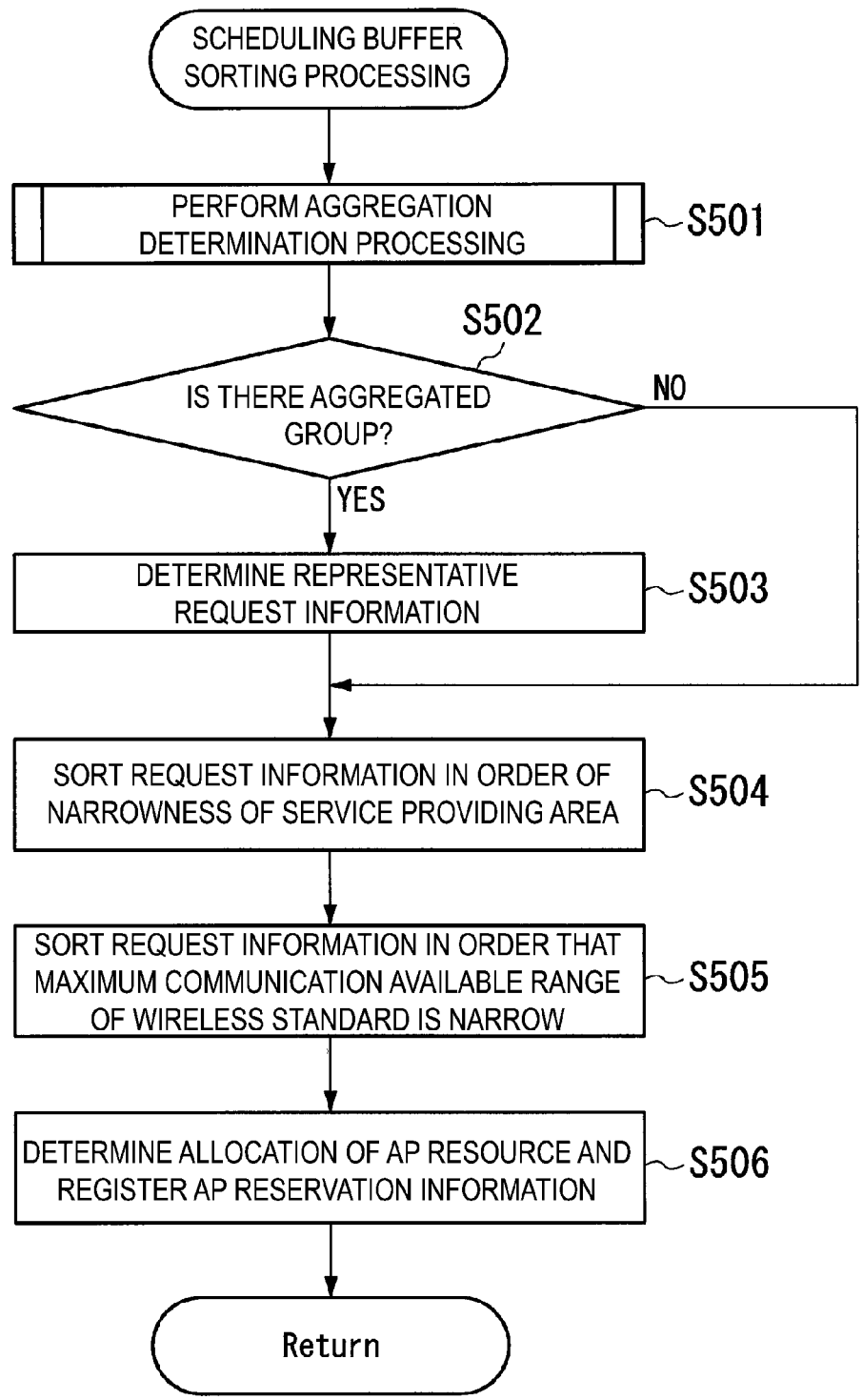
FIG. 27 is a flowchart illustrating scheduling buffer sorting processing in the third embodiment.

FIG. 27 is a flowchart illustrating scheduling buffer sorting processing in the third embodiment.

Firstly, the selection unit 13b performs aggregation determination processing based on each piece of request information stored in the scheduling buffer (for example, request information illustrated in FIG. 10) (Step S501). The aggregation determination processing is processing for determining whether the request information stored in the scheduling buffer can be grouped. Specific processes of the aggregation determination processing will be described in FIG. 28. The selection unit 13b groups pieces of request information determined to be able to be grouped by the aggregate determination processing. The selection unit 13b does not group pieces of request information determined to be unable to be grouped by the aggregate determination processing.

Figure 28:
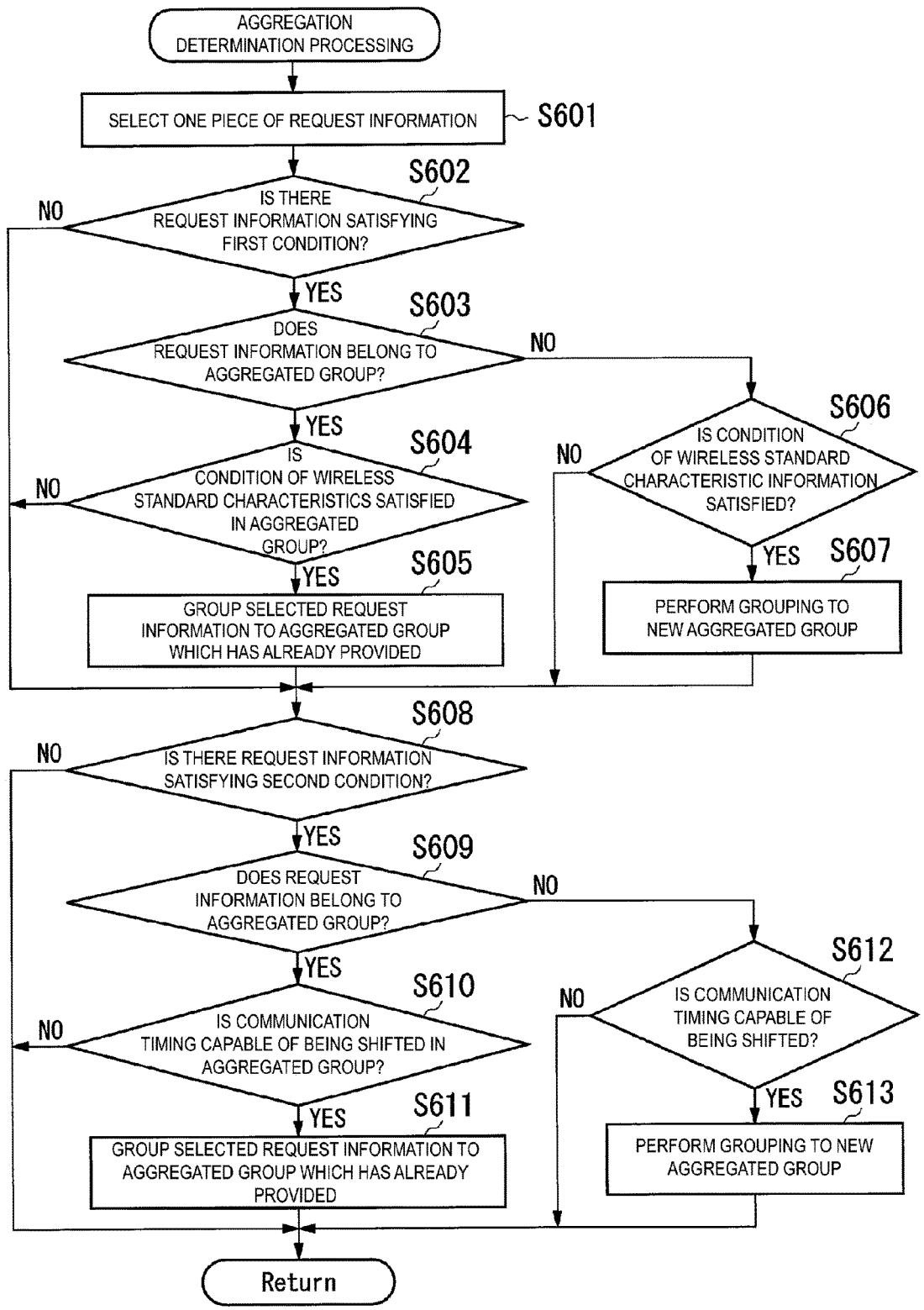
FIG. 28 is a flowchart illustrating aggregation determination processing in the third embodiment.

FIG. 28 is a flowchart illustrating the aggregation determination processing. The selection unit 13b selects one piece of the request information stored in the scheduling buffer (Step S601). The selection unit 13b determines whether there is request information satisfying a first condition, with reference to the request information stored in the scheduling buffer (Step S602). The first condition refers to a condition for determining whether to be associated with the selected request information. For example, the first condition is used for determining whether the wireless standard is identical to the wireless standard requested by the selected request information, whether an area overlaps the service providing area requested by the selected request information, and whether a time overlaps a service providing time requested by the selected request information.

In a case where there is request information satisfying the first condition among the pieces of request information stored in the scheduling buffer (YES in Step S602), the selection unit 13b determines whether the request information satisfying the first condition belongs to the aggregated group (Step S603). The aggregated group refers to a group of request information grouped by the aggregation determination processing. In a case where the request information belongs to the aggregated group (YES in Step S603), the selection unit 13b determines whether the condition of a wireless standard characteristic is satisfied in the aggregated group to which the request information satisfying the first condition belongs (Step S604). Whether or not the condition of the wireless standard characteristic is satisfied is determined based on the wireless standard characteristic table 240. In a case where the condition of the wireless standard characteristic is satisfied (YES in Step S604), the selection unit 13b groups the selected request information into an aggregated group which satisfies the condition of the wireless standard characteristic (Step S605).

In the process of Step S603, in a case where the request information does not belong to the aggregated group (NO in Step S603), the selection unit 13b determines whether the condition of the wireless standard characteristic is satisfied, including the request information satisfying the first condition and the selected request information (Step S606). In a case where the condition of the wireless standard characteristic is satisfied (YES in Step S606), the selection unit 13b groups the request information which does not belong to the aggregated group and satisfies the first condition, and the selected request information to a new group (Step S607). At this time, the selection unit 13b assigns an aggregated group ID to the new group. The aggregated group ID is information for identifying an aggregated group. The same aggregated group ID is assigned to request information belonging to the same aggregated group.

In a case where there is no request information satisfying the first condition in the process of Step S602 (NO in Step S602), after the process of Step S605 or Step S607, the selection unit 13b determines whether there is request information satisfying a second condition, with reference to the request information stored in the scheduling buffer (Step S608). The second condition refers to a condition for determining whether to be associated with the selected request information. For example, the first condition is used for determining whether the wireless standard is different from the wireless standard requested by the selected request information, whether an area overlaps the service providing area requested by the selected request information, and whether a time overlaps a service providing time requested by the selected request information.

In a case where there is request information satisfying the second condition among the pieces of request information stored in the scheduling buffer (YES in Step S608), the selection unit 13b determines whether the request information satisfying the second condition belongs to the aggregated group (Step S609). In a case where the request information belongs to the aggregated group (YES in Step S609), the selection unit 13b determines whether the communication timing is shifted in the aggregated group to which the request information satisfying the second condition belongs (Step S604). Whether the communication timing is shifted is determined based on the communication interval included in the request information. In a case where the communication timing is capable of being shifted (YES in Step S610), the selection unit 13b groups the selected request information into an aggregated group satisfying the condition in which the communication timing is shifted (Step S611).

In the process of Step S609, in a case where the request information does not belong to the aggregated group (NO in Step S609), the selection unit 13b determines whether the communication timing is capable of being shifted in a case where the selection unit 13b groups the request information satisfying the second condition and the selected request information (Step S612).

In a case where the condition in which the communication timing is capable of being shifted is satisfied (YES in Step S612), the selection unit 13b groups the request information which does not belong to the aggregated group and satisfies the second condition, and the selected request information to a new group (Step S613). At this time, the selection unit 13b assigns an aggregated group ID to the new group.

In a case where there is no request information satisfying the second condition in the process of Step S608 (NO in Step S608), after the process of Step S611 or Step S613, the selection unit 13b ends the processing in FIG. 28.

The selection unit 13b performs the processing illustrated in FIG. 28 to group the request information stored in the scheduling buffer, as illustrated in FIG. 29. FIG. 29 is a diagram illustrating a specific example of the scheduling buffer after the aggregation determination processing.

As illustrated in FIG. 29, request information to which the service ID of "1" is assigned and request information to which "2" is assigned are grouped into the same aggregated group of "a". Request information to which the service ID of "3" is assigned and request information to which "4" is assigned are grouped into the same aggregated group of "b".

Returning to FIG. 27, the selection unit 13b determines there is an aggregated group, with reference to the scheduling buffer (Step S502). If there is an aggregated group in the scheduling buffer (YES in Step S502), the selection unit 13b determines the request information in which the service providing area is narrowest among pieces of request information belonging to the same aggregated group, to be representative request information of the aggregated group (Step S503). In a case where there are a plurality of request information in which the service providing area is narrowest, the selection unit 13b may perform determination randomly, may perform determination based on another criterion, or may determine request information in which the number of the service ID is small.

After the process of Step S503 or in a case where the aggregated group is not provided in the scheduling buffer (YES in Step S502), the selection unit 13b sorts the request information stored in the scheduling buffer (for example, request information in the scheduling buffer illustrated in FIG. 29) in order that the service providing area is narrow (Step S504). At this time, the selection unit 13b sorts the aggregated group based on the service providing area included in the representative request information. For example, in a case of FIG. 29, it is assumed that representative request information of the aggregated group of "a" is request information to which the service ID of "2" is assigned, and the representative request information of the aggregated group of "b" is request information to which the service ID of "3" is assigned. In this case, the selection unit 13b compares the service providing area requested by request information (request information to which the service ID of "2" is assigned) being the representative request information of the aggregated group of "a", with the service providing area requested by request information request information to which the service ID of "3" is assigned) being the representative request information of the aggregated group of "b". Then, the selection unit 13b performs sorting in order of the aggregated group of "a" and the aggregated group of "b".

The selection unit 13b performs sorting in the aggregated group, based on the service providing area. In this case, in the example illustrated in FIG. 29, the selection unit 13b compares the service providing area requested by the request information to which the service ID of "1" is assigned in the aggregated group of "a", with the service providing area requested by the request information to which the service ID of "2" is assigned. The service providing area requested by the request information to which the service ID of "2" is assigned is narrower than the service providing area requested by the request information to which the service ID of "1" is assigned. Thus, the selection unit 13b sorts the request information to which the service ID of "2" is assigned and the request information to which the service ID of "1" is assigned in the aggregated group of "a", in this order. The service providing area requested by the request information to which the service ID of "3" is assigned is equal to the service providing area requested by the request information to which the service ID of "4" is assigned, in the aggregated group of "b". Thus, the selection unit 13b does not perform sorting.

The selection unit 13b sorts each piece of the request information stored in the scheduling buffer in order that the maximum communication available range of the wireless standard is narrow (Step S505). At this time, the selection unit 13b sorts the aggregated group based on the maximum communication available range of the wireless standard included in the representative request information. For example, in a case of FIG. 29, it is assumed that the representative request information of the aggregated group of "a" is request information to which the service ID of "2" is assigned, and the representative request information of the aggregated group of "b" is requested information to which the service ID "3" is assigned. In this case, the selection unit 13b compares the wireless standard requested by request information (request information to which the service ID of "2" is assigned) being the representative request information of the aggregated group of "a", with the wireless standard requested by request information (request information to which the service ID of "3" is assigned) being the representative request information of the aggregated group of "b". Then, the selection unit 13b performs sorting in order of the aggregated group of "a" and the aggregated group of "b". At this time, the selection unit 13b sorts the request information in a state where the order that the service providing area is narrow is maintained, such that the request information is sorted in order that the maximum communication available range of the wireless standard is narrow.

The selection unit 13b performs the process of Step S505 to sort the request information stored in the scheduling buffer, as illustrated in FIG. 30. FIG. 30 is a diagram illustrating a specific example of the scheduling buffer after sorting processing in the third embodiment. As illustrated in FIG. 30, it is shown that the processing order of the aggregated group of "b" is "1" and the processing order of the aggregated group "a" is "2". Then, the selection unit 13b ends the scheduling buffer sorting processing illustrated in FIG. 27. The processes after the scheduling buffer sorting process are identical to the processes in the first embodiment, and thus repetitive description will be omitted.

With the configuration in the third embodiment described above, the AP management apparatus 10b groups the request information before sorting, in a case where grouping the request information is possible. Thus, it is possible to perform the sorting processing in the aggregated group. Because the request information belonging to the aggregated group has the same condition, it is possible to assign the AP 30 with higher efficiency by assigning the AP 30 in the aggregated group. As a result, it is possible to improve use efficiency of the AP 30.

In the first to third embodiments described above, the AP capacity information table 220 has items of "AP-ID" for identifying the AP 30, "installation area" indicating the position of the AP 30, and "hardware wireless processing unit ID" for identifying the hardware wireless processing unit 34-1, 34-2, . . . included in the AP 30. In addition to the items, the AP capacity information table 220 has items of "wireless standard" indicating a wireless standard for a wireless communication service to be provided, "service providing area" indicating a providing area of the wireless communication service to be provided, "data rate" indicating the quality of the wireless communication service to be provided, and "guaranteed delay time" for each number of accommodated terminal apparatuses. However, the configuration of the present disclosure is not limited to the embodiments. For example, an item other than "data rate" or "guaranteed delay time", for example, an item of a corresponding frequency may be included as an item indicating the quality of the wireless communication service to be provided. The request information may include items indicating the quality of the wireless communication service other than "data rate" or "allowable delay time" being the items indicating the quality of the wireless communication service.

In the first to third embodiments described above, in the AP capacity information table 220 illustrated in FIG. 6, the item of the guaranteed delay time is configured from three items being 100 accommodated radio terminal apparatuses, 200 accommodated radio terminal apparatuses, and 300 accommodated radio terminal apparatuses 50. The item of the guaranteed delay time may be configured from more items.

Figure 31:
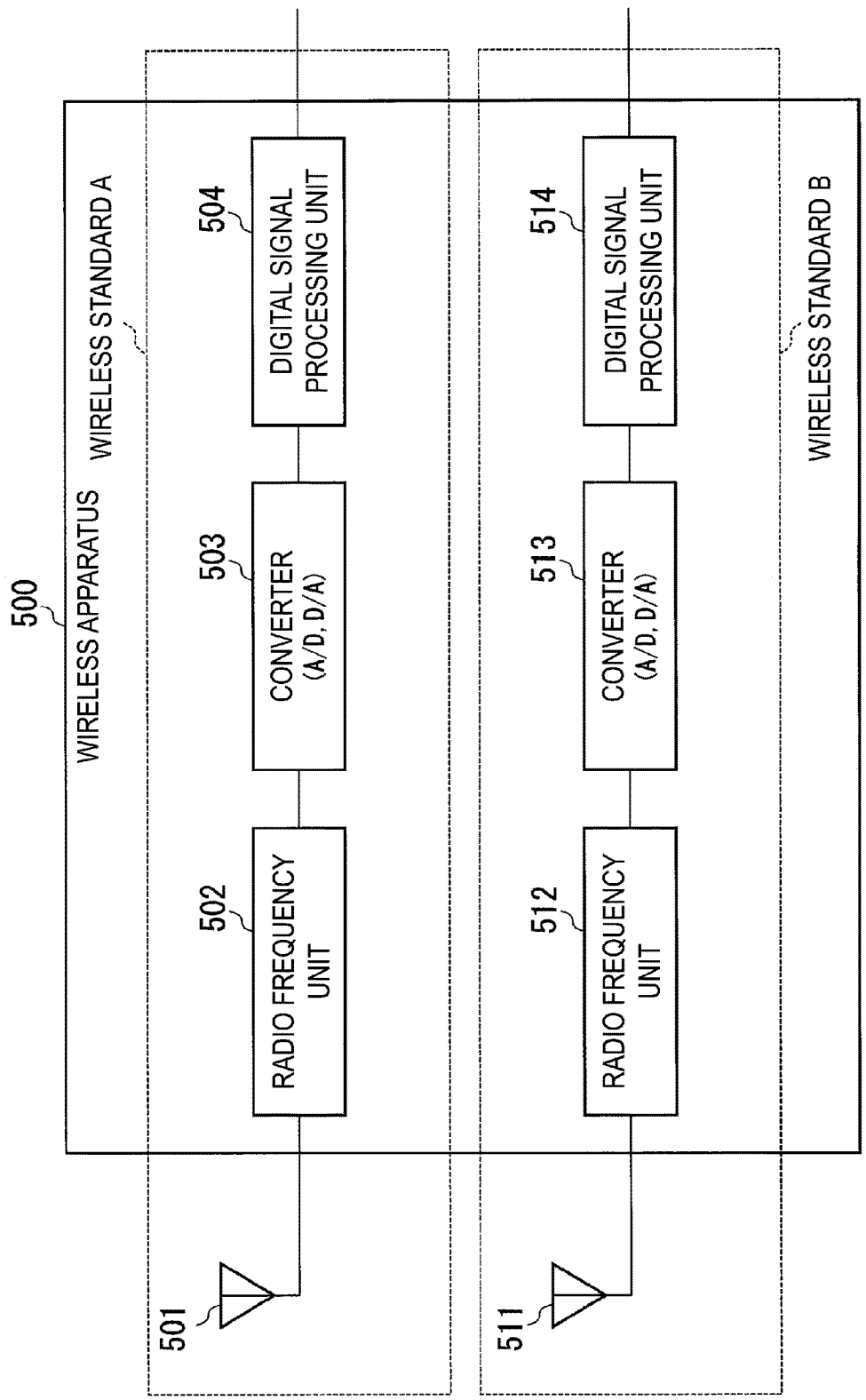
FIG. 31 is a block diagram (part 1) illustrating a configuration of a wireless apparatus for explaining software defined radio.
Figure 32:
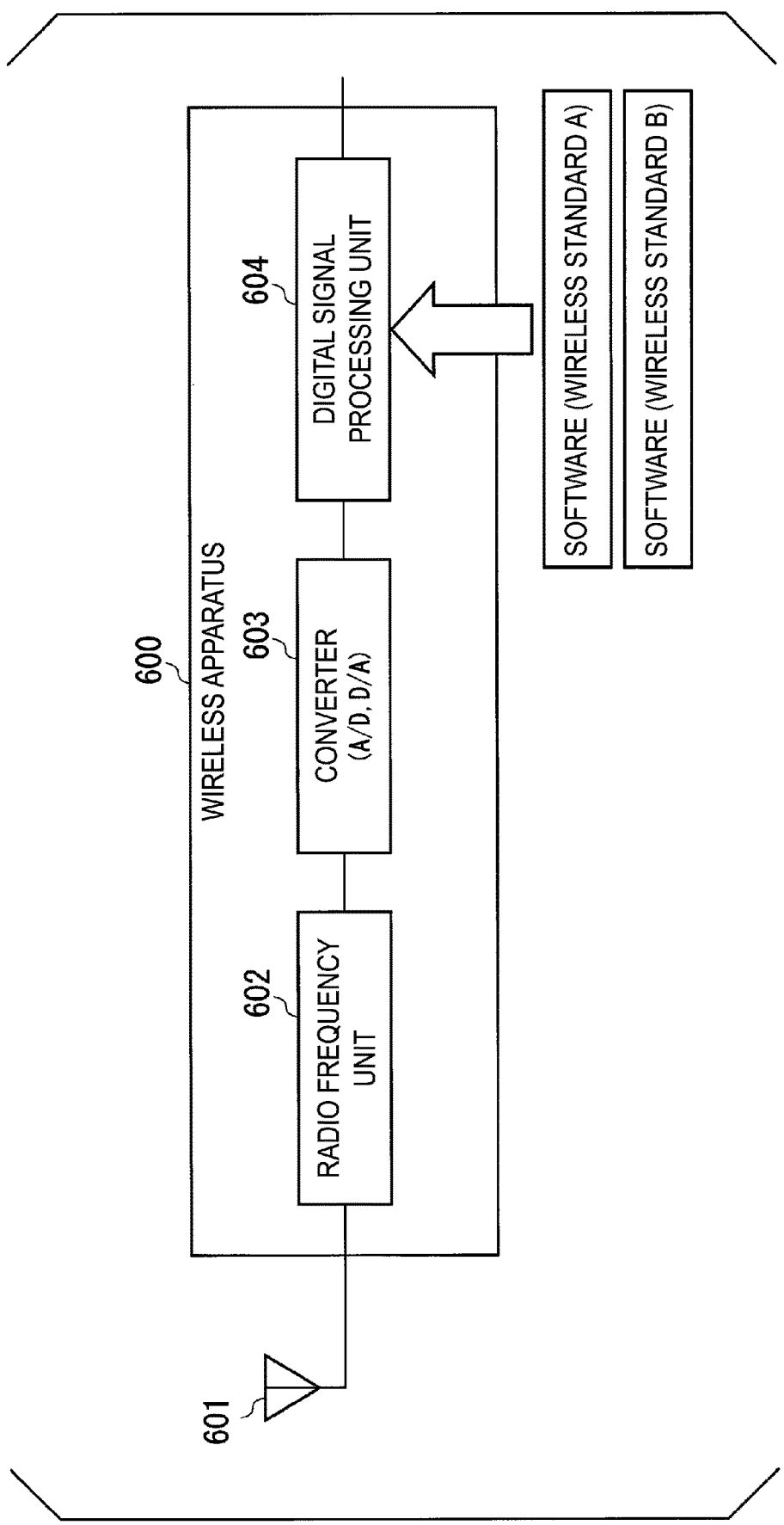
FIG. 32 is a block diagram (part 2) illustrating the configuration of the wireless apparatus for explaining software defined radio.

In the first to third embodiments described above, the configuration in which the AP 30 includes the wireless processing unit 33 corresponding to SDR is described. However, the configuration of the present disclosure is not limited to the embodiments. The AP 30 may be an access point that does not correspond to SDR and includes, for example, a wireless processing unit including a radio frequency unit, a converter, and a digital signal processing unit for each wireless standard as illustrated in FIG. 31. Such an access point and the AP 30 may be mixed in the AP management system 1.

The AP management apparatuses 10, 10a, and 10b and the AP 30 in the above-described embodiments may be implemented in a computer. In this case, the apparatus and the AP may be implemented in a manner that a program for realizing the function may be recorded on a computer readable recording medium, and the program recorded on the recording medium may be loaded into a computer system and executed. It is assumed that "the computer system" here includes an OS or hardware such as peripheral devices. "The computer readable recording medium" refers to a portable medium such as a flexible disk, a magneto-optical disk, a ROM, and a CD-ROM, and a storage device such as a hard disk mounted in a computer system. "The computer readable recording medium" may a medium that dynamically holds a program for a short period, for example, a communication line in a case where the program is transmitted via a network such as the Internet or a communication circuit line such as a telephone line; and a medium that holds a program for a predetermined period, for example, a volatile memory in a computer system as a server or a client in that case. The program may also be configured to realize some of the above-described functions, or may allow realization of the above-described functions by a combination with a program which has already been recorded in a computer system. The program may be achieved using a programmable logic device such as a Field Programmable Gate Array (FPGA).

Hitherto, the embodiments of the present disclosure have been described above in detail with reference to the drawings, but the specific configuration is not limited to the embodiments, and designs in a range without departing from the gist of the present disclosure are also included.

REFERENCE SIGNS LIST

1 AP Management system
10 AP management apparatus
11 Policy information acquisition unit
12 Request information acquisition unit
13 Selection unit
14 Requesting unit
15 Information collection unit
16 Transmission/reception unit
20 Wireless service assignment AP information database
21 AP use status information database
22 AP capacity information database
23 Policy information database
24 Wireless standard characteristic database
30 AP
31 Control unit
32 Transmission/reception unit
33 Wireless processing unit
34-1, 34-2 Hardware wireless processing unit
35 Software wireless processing unit
36 Storage unit
37-1, 37-2 Antenna
50 Radio terminal apparatus

The invention claimed is:

1. An access point management method for managing a plurality of access points capable of providing wireless communication services in accordance with a plurality of wireless standards to a radio terminal apparatus, the method comprising:
   acquiring plural pieces of request information used for requesting to provide the wireless communication service, the plural pieces of request information comprising information indicating one or more areas in which the wireless communication service is provided;
   selecting the access point assigned to each wireless communication service, based on the one or more areas requested by each of the plural pieces of request information acquired and characteristics of a wireless standard provided in the wireless communication service; and
   transmitting a request signal for deploying the wireless communication service corresponding to the request information, to the access point selected,
   wherein the one or more areas requested by each of the plural pieces of request information acquired are areas of the same size or areas of different sizes,
   wherein, in selecting the access point assigned to each wireless communication service, an order of assigning the access point to each wireless communication service by sorting the wireless communication service in an order of decreasing size of the one or more areas requested by each of the plural pieces of request information.

2. The access point management method according to claim 1,
   wherein the one or more areas requested by each of the plural pieces of request information acquired are areas of the same size or areas of different sizes,
   wherein, in selecting the access point assigned to each wireless communication service, an order of assigning the access point to each wireless communication service by sorting the wireless communication service in an order of decreasing size of the one or more areas requested by each of the plural pieces of request information and sorting the wireless communication service after sorting, in accordance with characteristics of the wireless standard.

3. The access point management method according to claim 1,
   wherein, in selecting the access point assigned to each wireless communication service, the wireless communication service after sorting is sorted in an order of decreasing size of a maximum communication available range of the wireless standard while maintaining an order of decreasing size of the one or more areas, and the access point is assigned in an order of decreasing size of the one or more areas and in an order of decreasing size of a maximum communication available range of the wireless standard.

4. The access point management method according to claim 1,
   wherein, in selecting the access point assigned to each wireless communication service, the plural pieces of acquired request information is grouped in accordance with a predetermined condition; and
   the wireless communication service required by each of the plural pieces of request information is sorted in response to any one or both of the request information belonging to a group obtained by grouping and the request information which does not belong to the group.

5. The access point management method according to claim 4,
   wherein, in selecting the access point assigned to each wireless communication service, in a case where the wireless standards used for different pieces of request information are identical to each other, and the request condition is satisfied, the different pieces of request information are grouped to the same group.

6. The access point management method according to claim 4,
   wherein, in selecting the access point assigned to each wireless communication service, in a case where the wireless standards used for different pieces of request information are different from each other, communication intervals of the wireless standard are intermittent, and communication timings are capable of being shifted from each other, the different pieces of request information are grouped to the same group.

7. The access point management method according to claim 4,
   wherein, in selecting the access point assigned to each wireless communication service, in a case where there is the request information belonging to the group,
   request information of requesting a narrowest area among pieces of the request information belonging to the group is set to representative request information of the group, and the wireless communication service is sorted in response to any one or both of the representative request information and the request information which does not belong to the group.

8. The access point management method according to claim 7,
wherein, in selecting the access point assigned to each wireless communication service, in a case where there is the request information belonging to the group,
request information of providing the wireless standard in which a maximum communication available range of the wireless standard is narrowest, among pieces of request information belonging to the group is set to representative request information of the group,
the wireless communication service after sorting is sorted in an ascending order of a maximum communication available range of the wireless standard while maintaining an order of decreasing size of the one or more areas, and
the access point is assigned in an order of decreasing size of the one or more areas and in an ascending order of a maximum communication available range of the wireless standard.

9. An access point management apparatus for managing a plurality of access points capable of providing wireless communication services in accordance with a plurality of wireless standards to a radio terminal apparatus, the apparatus comprising:
an acquisition unit configured to acquire plural pieces of request information used for requesting to provide the wireless communication service, the plural pieces of request information comprising information indicating an one or more areas in which the wireless communication service is provided;
a selection unit configured to select the access point assigned to each wireless communication service, based on the one or more areas requested by each of the plural pieces of request information acquired and characteristics of a wireless standard provided in the wireless communication service; and
a requesting unit configured to transmit a request signal for deploying the wireless communication service corresponding to the request information, to the access point selected,
wherein the one or more areas requested by each of the plural pieces of request information acquired are areas of the same size or areas of different sizes,
wherein the selection unit selects the access point assigned to each wireless communication service, an order of assigning the access point to each wireless communication service by sorting the wireless communication service in an order of decreasing size of the one or more areas requested by each of the plural pieces of request information,
wherein each of the acquisition unit, the selection unit and the requesting unit is implemented by:
i) computer executable instructions executed by at least one processor,
ii) at least one circuitry or
iii) a combination of computer executable instructions executed by at least one processor and at least one circuitry.

10. An access point management system comprising:
a plurality of access points configured to provide wireless communication services in accordance with a plurality of wireless standards to a radio terminal apparatus; and
an access point management apparatus configured to manage the plurality of access points,
wherein the access point management apparatus comprises
an acquisition unit configured to acquire plural pieces of request information used for requesting to provide the wireless communication service, the plural pieces of request information comprising information indicating an one or more areas in which the wireless communication service is provided,
a selection unit configured to select the access point assigned to each wireless communication service, based on the one or more areas requested by each of the plural pieces of request information acquired and characteristics of a wireless standard provided in the wireless communication service, and
a requesting unit configured to transmit a request signal for deploying the wireless communication service corresponding to the request information, to the selected access point; and
the access point comprises
a control unit configured to receive the request signal and output an instruction signal in response to the request signal, and
a wireless processing unit configured to provide the wireless communication service based on the instruction signal,
wherein the one or more areas requested by each of the plural pieces of request information acquired are areas of the same size or areas of different sizes,
wherein the selection unit selects the access point assigned to each wireless communication service, an order of assigning the access point to each wireless communication service by sorting the wireless communication service in an order of decreasing size of the one or more areas requested by each of the plural pieces of request information.

* * * * *